United States Patent [19]
Nomura et al.

[11] Patent Number: 6,014,269
[45] Date of Patent: Jan. 11, 2000

[54] ENGAGING STRUCTURE OF RELATIVELY-ROTATABLE CYLINDRICAL MEMBERS

[75] Inventors: Hiroshi Nomura, Saitama; Kazuyoshi Azegami, Tokyo; Takamitsu Sasaki, Saitama; Kazunori Ishizuka, Kanagawa, all of Japan

[73] Assignee: Asahi Kogaku Kogyo Kabushiki Kaisha, Tokyo, Japan

[21] Appl. No.: 09/179,200

[22] Filed: Oct. 27, 1998

[30] Foreign Application Priority Data

Oct. 27, 1997 [JP] Japan ................................. 9-294293

[51] Int. Cl.⁷ .............................. G02B 15/14; G02B 7/02
[52] U.S. Cl. ...................... 359/701; 359/700; 359/703; 359/822; 359/823
[58] Field of Search .................... 359/696, 698, 359/700, 701, 819, 823, 694, 703, 704

[56] References Cited

U.S. PATENT DOCUMENTS

| | | | |
|---|---|---|---|
| 5,144,494 | 9/1992 | Sekiguchi | 359/700 |
| 5,570,153 | 10/1996 | Shono | 396/531 |
| 5,793,537 | 8/1998 | Nomura et al. | 359/700 |
| 5,812,325 | 9/1998 | Nomura et al. | 359/700 |
| 5,854,712 | 12/1998 | Okama | 359/823 |
| 5,886,836 | 3/1999 | Sasaki et al. | 359/823 |
| 5,900,992 | 5/1999 | Kodaka et al. | 359/702 |

*Primary Examiner*—Georgia Epps
*Assistant Examiner*—Saeed Seyrafi
*Attorney, Agent, or Firm*—Greenblum & Bernstein, P.L.C.

[57] ABSTRACT

Disclosed is an engaging structure of two cylindrical members. At least part of one of the two cylindrical members is coaxially fitted on the other cylindrical member. The engaging structure includes: a plurality of radial projections formed on the second cylindrical member; two annular flanges formed on the other cylindrical member to form a circumferential groove therebetween, the plurality of radial projections being fitted in the circumferential groove; and a plurality of cut-away portions, formed on one of the two annular flanges, through which the plurality of radial projections are respectively inserted into the circumferential groove. Each corresponding pair of the plurality of projections and the plurality of cut-away portions are formed to have a circumferential width different from those of the other corresponding pairs of the plurality of projections and the plurality of cut-away portions. At least one of corresponding pairs of the plurality of projections and the plurality of cut-away portions are formed to have a radial length different from those of the other corresponding pairs of the plurality of projections and the plurality of cut-away portions.

24 Claims, 12 Drawing Sheets

6,014,269

ENGAGING STRUCTURE OF RELATIVELY-ROTATABLE CYLINDRICAL MEMBERS

BACKGROUND OF THE INVENTION

1. Field of the Invention

The present invention relates to an engaging structure of two cylindrical members, at least one of which is rotatable relative to the other about a common axis.

2. Description of the Related Art

In the case where two cylindrical members (e.g., two cylindrical members provided in a zoom lens barrel of a zoom lens camera) need to be axially engaged so that at least one of the two cylindrical members is rotatable relative to the other cylindrical member about a common axis, it is often the case that a plurality of engaging projections are formed on one of the two cylindrical members (i.e., first cylindrical member) while a circumferential groove in which the plurality of projections can be slidably fitted is formed on the other cylindrical member (i.e., second cylindrical member). The circumferential groove is generally formed between a couple of front and rear flanges each extending out radially from the outer peripheral surface of the second cylindrical member. One of the flanges is provided with a plurality of cut-away portions through which the plurality of engaging projections can enter the circumferential groove in the axial direction. After the plurality of engaging projections are inserted into the circumferential groove through the plurality of cut-away portions, the first and second cylindrical members are engaged with each other by means of rotating the first and second cylindrical members relative to each other about a common axis by a certain amount of rotation (angle of rotation). In this state of engagement, the plurality of projections of the first cylindrical member are prevented from disengaging from the circumferential groove of the second cylindrical member in the axial direction. Due to the nature of such an engaging structure, the maximum relative amount of rotation (angle of rotation) between the first and second cylindrical members formerly depends upon the number of the engaging projections of the first cylindrical members. For instance, if only one engaging projection is formed on the first cylindrical member while a corresponding cut-away portion is formed on the second cylindrical member, the maximum relative angle of rotation can be set close to 360 degrees; which is, however, impractical because stable engagement cannot be ensured between the two cylindrical members. In the case where three engaging projections are formed on the first cylindrical members circumferentially at regular intervals while corresponding three cut-away portions are formed on the second cylindrical member, the maximum relative angle of rotation is approximately 120 degrees. In order to ensure stable engagement between the two cylindrical members, it is preferable that three or more engaging projections are formed on the first cylindrical members while the corresponding number of cut-away portions are formed on the second cylindrical member. However, as the number of the engaging projections increases, the maximum relative angle of rotation decreases because the number of the cut-away portions increases.

In such a conventional engaging structure using the plurality of engaging projections and the circumferential groove, in the case where it is necessary to make the maximum relative angle of rotation larger than a usual case, e.g., in the case of making the maximum relative angle of rotation over 120 degrees even though the first cylindrical member is provided with three engaging projections circumferentially at regular intervals, it is possible to make the maximum relative angle of rotation over 120 degrees by proving an extra rotatable member (relaying member) between the first and second cylindrical members that is rotatable relative to each of the first and second cylindrical members, or by simply decreasing the number of the engaging projections. Providing such an extra rotatable member is costly, space-consuming; and thus, not preferable. On the other hand, decreasing the number of the engaging projections generally causes unstable engagement between the two cylindrical members, which is not preferable either.

A different type of conventional engaging structure using a plurality of engaging projections formed on the first cylindrical member and a circumferential groove formed on the second cylindrical member is known. In this conventional type, each engaging projection of the first cylindrical member is made of a resilient material and is formed to be slightly greater than the corresponding cut-away portion formed on the second cylindrical member, so that each engaging projection is inserted into the circumferential groove through the corresponding cut-away portion by being deformed to pass through the same. In this type, it is possible to make the maximum relative angle of rotation between the two cylindrical members large, regardless of the number of the engaging projections. However, since the engaging projections need to be hard-pressed against the cut-away portions to pass through the same so as to be fitted in the circumferential groove, it is not so easy for the two cylindrical members to be engaged and assembled. Furthermore, in this type, there is a high probability of the engaging projections disengaging from the circumferential groove as the cut-away portions cannot be formed much smaller than the engaging projections.

SUMMARY OF THE INVENTION

It is an object of the present invention to provide a engaging structure of two relatively-rotatable cylindrical members which makes it possible to make the aforementioned maximum relative angle of rotation between the two cylindrical members large, without deteriorating the stable engagement or providing any extra cylindrical member between the two cylindrical members.

According to an aspect of the present invention, there is provided an engaging structure of two cylindrical members, wherein at least part of one of the two cylindrical members is coaxially fitted on the other cylindrical member, the engaging structure including: a plurality of engaging projections which project radially from the one cylindrical member at different circumferential positions thereon; two annular flanges formed on the other cylindrical member along a circumference thereof to form a circumferential groove between the two annular flanges, the plurality of engaging projections being fitted in the circumferential groove to be guided along the circumferential groove so as to allow relative rotation between the two cylindrical members; and a plurality of cut-away portions which are formed on one of the two annular flanges to correspond to the plurality of engaging projections and through which the plurality of engaging projections are respectively inserted into the circumferential groove, wherein each corresponding pair of the plurality of engaging projections and the plurality of cut-away portions are formed to have a width in a circumferential direction that is different from those of the other corresponding pairs of the plurality of engaging projections and the plurality of cut-away portions, and wherein at least one of corresponding pairs of the plurality of engaging projections and the plurality of cut-away portions are formed to have a length in a radial direction that is different from those of the other corresponding pairs of the plurality of engaging projections and the plurality of cut-away portions.

Preferably, the plurality of engaging projections include three engaging projections formed at regular intervals along a circumference of the one cylindrical member, wherein the plurality of cut-away portions includes three cut-away portions formed to correspond to the three engaging projections at regular intervals along a circumference of the other cylindrical member, and wherein one of corresponding pairs of the three engaging projections and the three cut-away portions which has the least circumferential width has a greater radial length than another one of the corresponding pairs of the three engaging projections and the three cut-away portions which has the greatest circumferential width.

Preferably, the two cylindrical members are relatively rotated about the common axis in a manner such that one of the three engaging projections which has the least circumferential width proceeds towards one of the three cut-away portions which has the greatest circumferential width without passing by another one of the three cut-away portions between the one of the three cut-away portions which has the greatest circumferential width and the other one of the three cut-away portions which has the least circumferential width along the circumferential groove.

The two cylindrical members can be elements of a zoom lens barrel of a camera. In this case, one of the two cylindrical members can be provided with a code sheet while the other of the two cylindrical members can be provided with a conductive brush which comes into contact with the code sheet, wherein the conductive brush slides on the code sheet when the two cylindrical members rotate relative to each other about the common axis.

According to another aspect of the present invention, there is provided an engaging structure of two cylindrical members, wherein at least part of one of the two cylindrical members is coaxially fitted on the other cylindrical member, the engaging structure including: a plurality of engaging projections which project radially from the one cylindrical member at different circumferential positions thereon; two annular flanges formed on the other cylindrical member along a circumference thereof to form a circumferential groove between the two annular flanges, the plurality of engaging projections being fitted in the circumferential groove to be guided along the circumferential groove so as to allow relative rotation between the two cylindrical members; and a plurality of cut-away portions which are formed on one of the two annular flanges to correspond to the plurality of engaging projections and through which the plurality of engaging projections are respectively inserted into the circumferential groove, wherein each corresponding pair of the plurality of engaging projections and the plurality of cut-away portions are formed to have a length in a radial direction that is different from those of the other corresponding pairs of the plurality of engaging projections and the plurality of cut-away portions, and wherein at least one of corresponding pairs of the plurality of engaging projections and the plurality of cut-away portions are formed to have a width in a circumferential direction that is different from those of the other corresponding pairs of the plurality of engaging projections and the plurality of cut-away portions.

Preferably, the plurality of engaging projections include three engaging projections formed at regular intervals along a circumference of the one cylindrical member, wherein the plurality of cut-away portions includes three cut-away portions formed to correspond to the three engaging projections at regular intervals along a circumference of the other cylindrical member, and wherein one of corresponding pairs of the three engaging projections and the three cut-away portions which has the least radial length has a greater circumferential width than another one of the corresponding pairs of the three engaging projections and the three cut-away portions which has the greatest radial length.

Preferably, the two cylindrical members are relatively rotated about the common axis in a manner such that one of the three engaging projections which has the least radial length proceeds towards one of the three cut-away portions which has the greatest radial length without passing by another one of the three cut-away portions between the one of the three cut-away portions which has the greatest radial length and the other one of the three cut-away portions which has the least radial length along the circumferential groove.

According to still another aspect of the present invention, there is provided an engaging structure of two cylindrical members, wherein at least part of one of the two cylindrical members is coaxially fitted on the other cylindrical member, the engaging structure including: a plurality of engaging projections which project radially from the one cylindrical member at different circumferential positions thereon; two annular flanges formed on the other cylindrical member along a circumference thereof to form a circumferential groove between the two annular flanges, the plurality of engaging projections being fitted in the circumferential groove to be guided along the circumferential groove so as to allow relative rotation between the two cylindrical members; and a plurality of cut-away portions which are formed on one of the two annular flanges to correspond to the plurality of engaging projections and through which the plurality of engaging projections are respectively inserted into the circumferential groove, wherein each corresponding pair of the plurality of engaging projections and the plurality of cut-away portions are formed to have a width in a circumferential direction and a length in a radial direction which are different from those of the other corresponding pairs of the plurality of engaging projections and the plurality of cut-away portions.

Preferably, radial lengths of the plurality of engaging projections are determined to decrease stepwisely in order from one of the plurality of engaging projections which has the least circumferential width to another one of the plurality of engaging projections which has the greatest circumferential width in the circumferential direction, so that the one of the plurality of engaging projections which has the least circumferential width has the greatest radial length while the another one of the plurality of engaging projections which has the greatest circumferential width has the least radial length, wherein radial lengths of the plurality of cut-away portions are determined to decrease stepwisely in order from one of the plurality of cut-away portions which has the least circumferential width to another one of the plurality of cut-away portions which has the greatest circumferential width in the circumferential direction, so as to correspond to the radial lengths of the plurality of engaging projections.

According to still another aspect of the present invention, there is provided a zoom lens barrel of a camera, including: a first cylindrical member guided along an optical axis without rotating about the optical axis; a second cylindrical member coaxially positioned on the first cylindrical member; and an engaging structure for engaging the first cylindrical member with the second cylindrical member so as to prevent the second cylindrical member from moving in a direction of the optical axis relative to the first cylindrical member while allowing the second cylindrical member to rotate about the optical axis relative to the first cylindrical member, wherein the engaging structure includes: a plurality of engaging projections which project radially from the second cylindrical member at different circumferential positions thereon; two annular flanges formed on the first cylindrical member along a circumference thereof to form a circumferential groove between the two annular flanges, the plurality of engaging projections being fitted in the circumferential groove to be guided along the circumferential groove so as to allow relative rotation between the first and second cylindrical members about the optical axis; and a plurality of cut-away portions which are formed on one of the two annular flanges to correspond to the plurality of engaging projections and through which the plurality of engaging projections are respectively inserted into the circumferential groove, wherein each corresponding pair of the plurality of engaging projections and the plurality of cut-away portions are formed to have a width in a circumferential direction that is different from those of the other corresponding pairs of the plurality of engaging projections and the plurality of cut-away portions, and wherein at least one of corresponding pairs of the plurality of engaging projections and the plurality of cut-away portions are formed to have a length in a radial direction that is different from those of the other corresponding pairs of the plurality of engaging projections and the plurality of cut-away portions.

According to still another aspect of the present invention, there is provided a zoom lens barrel of a camera, including: a first cylindrical member guided along an optical axis without rotating about the optical axis; a second cylindrical member coaxially positioned on the first cylindrical member; and an engaging structure for engaging the first cylindrical member with the second cylindrical member so as to prevent the second cylindrical member from moving in a direction of the optical axis relative to the first cylindrical member while allowing the second cylindrical member to rotate about the optical axis relative to the first cylindrical member, wherein the engaging structure includes: a plurality of engaging projections which project radially from the second cylindrical member at different circumferential positions thereon; two annular flanges formed on the first cylindrical member along a circumference thereof to form a circumferential groove between the two annular flanges, the plurality of engaging projections being fitted in the circumferential groove to be guided along the circumferential groove so as to allow relative rotation between the first and second cylindrical members about the optical axis; and a plurality of cut-away portions which are formed on one of the two annular flanges to correspond to the plurality of engaging projections and through which the plurality of engaging projections are respectively inserted into the circumferential groove, wherein each corresponding pair of the plurality of engaging projections and the plurality of cut-away portions are formed to have a length in a radial direction that is different from those of the other corresponding pairs of the plurality of engaging projections and the plurality of cut-away portions, and wherein at least one of corresponding pairs of the plurality of engaging projections and the plurality of cut-away portions are formed to have a width in a circumferential direction that is different from those of the other corresponding pairs of the plurality of engaging projections and the plurality of cut-away portions.

According to another aspect of the present invention, there is provided a zoom lens barrel of a camera, including: a first cylindrical member guided along an optical axis without rotating about the optical axis; a second cylindrical member coaxially positioned on the first cylindrical member; and an engaging structure for engaging the first cylindrical member with the second cylindrical member so as to prevent the second cylindrical member from moving in a direction of the optical axis relative to the first cylindrical member while allowing the second cylindrical member to rotate about the optical axis relative to the first cylindrical member, wherein the engaging structure includes: a plurality of engaging projections which project radially from the second cylindrical member at different circumferential positions thereon; two annular flanges formed on the first cylindrical member along a circumference thereof to form a circumferential groove between the two annular flanges, the plurality of engaging projections being fitted in the circumferential groove to be guided along the circumferential groove so as to allow relative rotation between the first and second cylindrical members about the optical axis; and a plurality of cut-away portions which are formed on one of the two annular flanges to correspond to the plurality of engaging projections and through which the plurality of engaging projections are respectively inserted into the circumferential groove, wherein each corresponding pair of the plurality of engaging projections and the plurality of cut-away portions are formed to have a circumferential width and a radial length that are different from those of the other corresponding pairs of the plurality of engaging projections and the plurality of cut-away portions.

According to still another aspect of the present invention, there is provided an engaging structure of a first cylindrical member and a second cylindrical member being at least partly coaxially fitted, the engaging structure including: an annular flange formed on the first cylindrical member, the annular flange forming one wall of a circumferential groove; engaging projections projecting radially from the second cylindrical member at different circumferential positions; and cut-away slots formed in the annular flange in circumferential positions corresponding to the engaging projections, the engaging projections being inserted to pass through the circumferential groove via corresponding ones of the cut-away slots, the circumferential groove permitting relative rotation between the first cylindrical member and the second cylindrical member and relative rotation of the engaging projections along the circumferential groove, at least one of the engaging projections and a corresponding one of the cut-away slots having a different size in a first direction from the remaining engaging projections and remaining cut-away slots, and each of the engaging projections and corresponding the cut-away slots having a different size in a second direction from the remaining engaging projections and remaining cut-away slots, so that when the at least one engaging projection is relatively rotated to face one of the remaining cut-away slots, the at least one engaging projection is prevented from passing through the one of the remaining cut-away slots.

According to still another aspect of the present invention, there is provided a zoom lens barrel of a camera, including: a first cylindrical member guided along an optical axis without rotating about the optical axis, an annular flange formed in the first cylindrical member, the annular flange forming one wall of a circumferential groove in the first cylindrical member; a second cylindrical member coaxially positioned on the first cylindrical member, engaging projections projecting radially from the second cylindrical member at different circumferential positions; cut-away slots being formed in the annular flange in circumferential positions corresponding to the engaging projections, the engaging projections being inserted to pass through the circumferential groove via corresponding ones of the cut-away slots, the circumferential groove permitting relative rotation between the first cylindrical member and the second cylindrical member and relative rotation of the engaging projections along the circumferential groove, at least one of the engaging projections and a corresponding one of the cut-away slots differing in one of a circumferential width and radial length from the remaining engaging projections and remaining cut-away slots, so that when the at least one engaging projection is relatively rotated to face one of the remaining cut-away slots, the at least one engaging projection is prevented from passing through the one of the remaining cut-away slots, preventing the second cylindrical member from moving in a direction of the optical axis relative to the first cylindrical member while allowing the second cylindrical member to rotate about the optical axis relative to the first cylindrical member.

The present disclosure relates to subject matter contained in Japanese Patent Application No. 09-294293 (filed on Oct. 27, 1997) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

FIGS. 1 through 4 show an embodiment of a zoom lens barrel 10 to which the present invention is applied. The zoom lens barrel 10 is fixed to a camera body 9 of a compact camera. The zoom lens barrel 10 is of a telescoping type having an first outer barrel (outer movable barrel) 17, a second outer barrel (middle movable barrel) 40 and a third outer barrel (inner movable barrel) 45 arranged in this order from an optical axis O so that the zoom lens barrel 10 can extend and retract in the direction of the optical axis O to vary the focal length. The zoom lens barrel 10 is provided with a photographic optical system consisting of a first lens group L1, a second lens group L2 and a third lens group L3. Each lens group is moved along the optical axis O relative to a film surface F while varying the respective distances thereamong to effect zooming. The second lens group L2 is moved along the optical axis O for focusing, i.e., for bringing a subject into focus. The overall structure and operation of the zoom lens barrel 10 will be hereinafter discussed.

Figure 1:
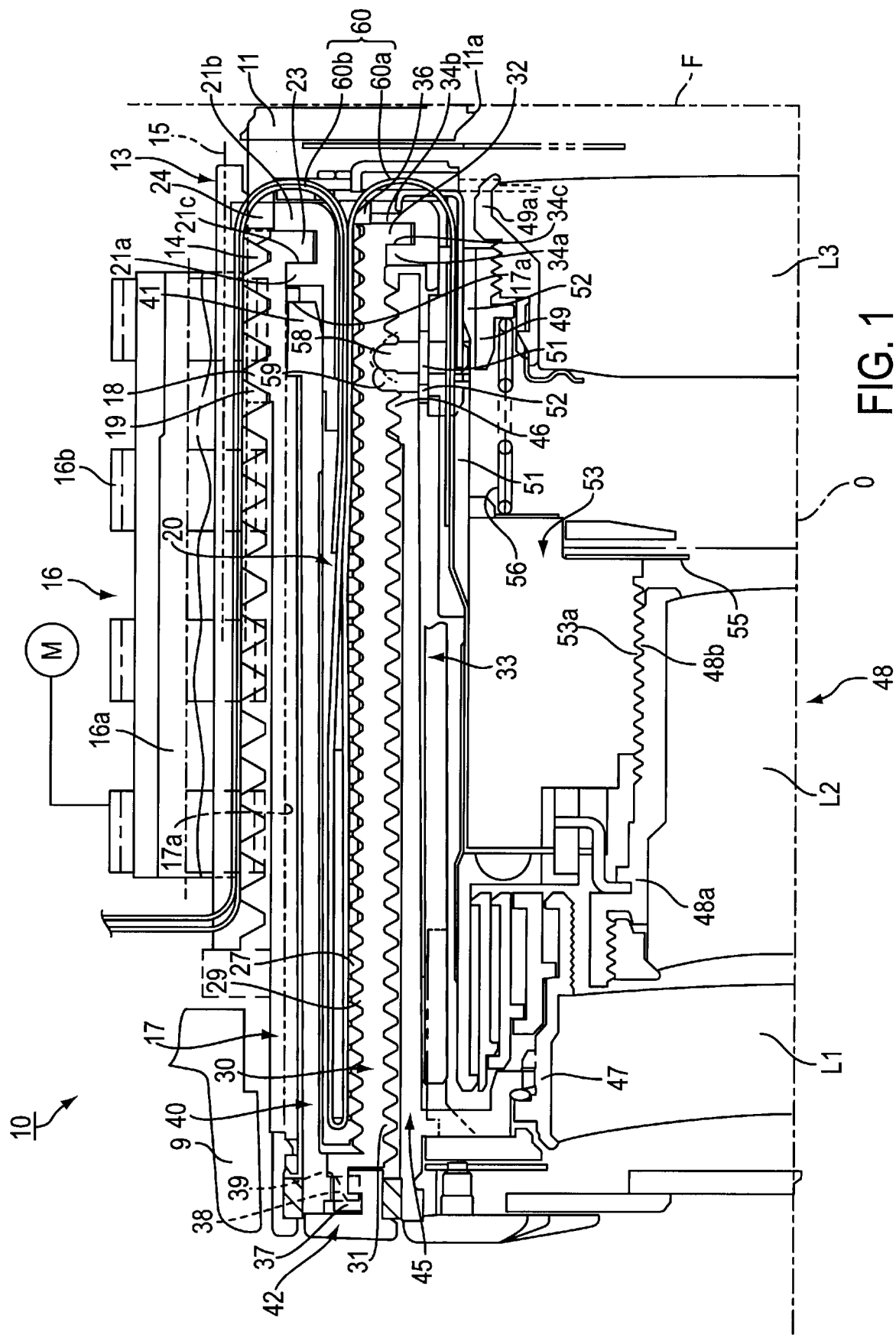
FIG. 1 is a longitudinal sectional view of a zoom lens barrel in a retracted position, according to an embodiment of the present invention.
Figure 2:
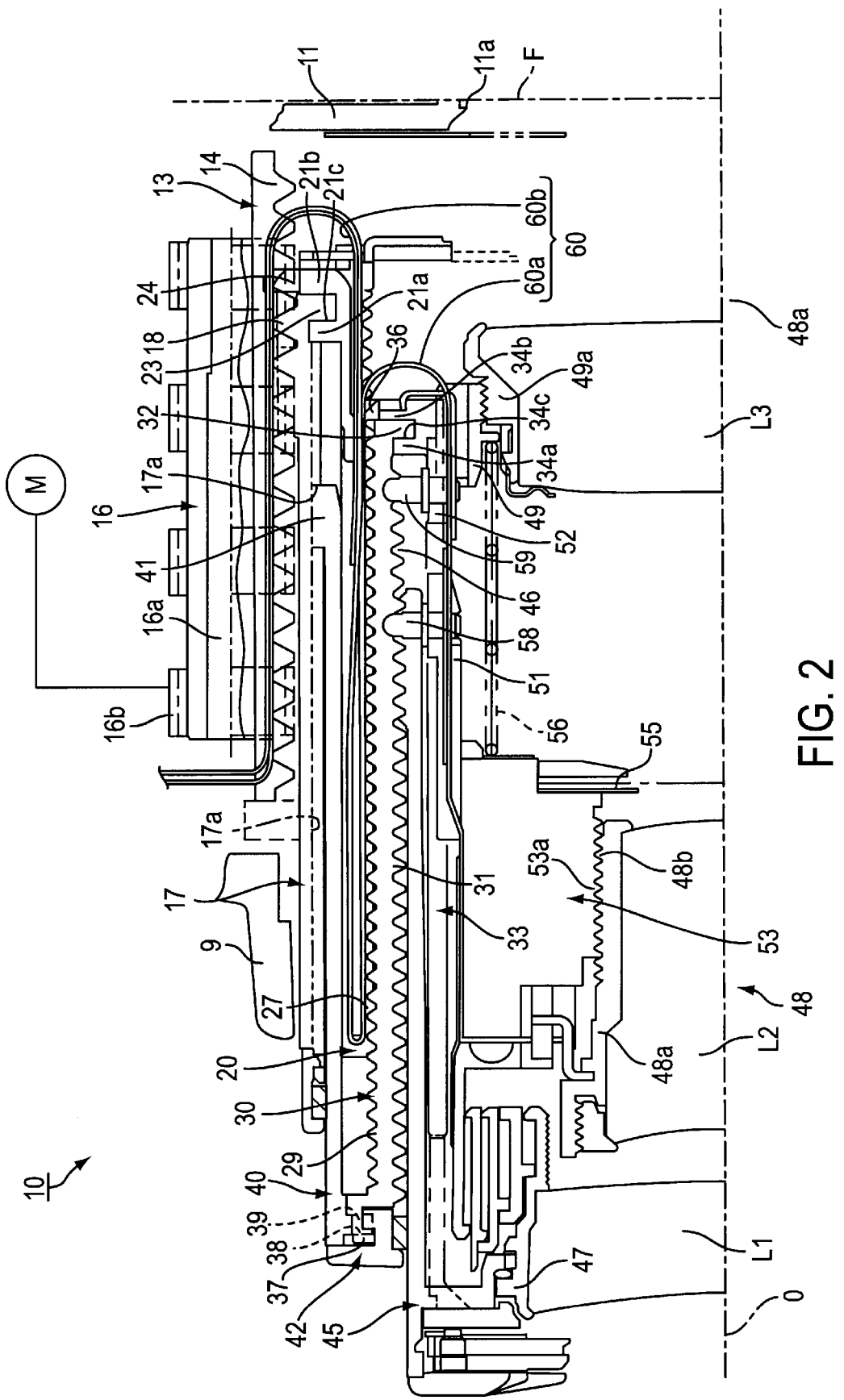
FIG. 2 is a longitudinal sectional view of the zoom lens barrel shown in FIG. 1, at a wide angle extremity.

An aperture plate 11 having a rectangular opening 11a at its center is secured to the camera body 9. The rectangular opening 11a forms the limits of each frame exposed. A stationary barrel 13 is secured to the camera body 9 in front of the aperture plate 11. The stationary barrel 13 is provided on its inner peripheral surface with a female helicoid 14 and three linear guide grooves 15 which extend in parallel with the optical axis O and which are circumferentially spaced from one another. Note that only one of the three linear guide grooves 15 is shown in FIG. 1.

The stationary barrel 13 is provided on its inner periphery with a recess 13a which extends in parallel with the optical axis O to receive a zoom gear 16 therein. The zoom gear 16 is provided with four pinion gears 16b integrally formed at regular intervals in the axial direction thereof. The zoom gear 16 is rotatably fitted on a rotational shaft 16a which extends in parallel with the optical axis O and whose front and rear ends are supported by the camera body 9 and the stationary barrel 13, respectively. Teeth of each pinion 16b partly projects into the inside of the stationary barrel 13 so as to mesh with a plurality of outer peripheral gears 19 formed on the first outer barrel 17. The drive force of a zoom motor M provided in the camera body 9 is transmitted to the zoom gear 16 through a reduction gear train (not shown).

First outer barrel 17 is fitted in the stationary barrel 13 so that a male helicoid 18 formed on the outer peripheral surface of the first outer barrel 17 is engaged with the female helicoid 14 of the stationary barrel 13. The width of the male helicoid 18 in the direction of the optical axis O is determined so that the male helicoid 18 does not dislodged from the stationary barrel 13 when the first outer barrel 17 is fully extended. The first outer barrel 17 is provided, on the outer peripheral surface thereof on which the male helicoid 18 is formed, with the aforementioned plurality of outer peripheral gears 19 each extending along threads of the male helicoid 18. The outer peripheral gears 19 stay in mesh with the zoom gear 16. The first outer barrel 17 is further provided on its inner peripheral surface with three grooves 17a (there is only one of them seen in FIG. 1) each extending in parallel with the optical axis O.

A first linear movement guide barrel 20 is positioned inside the first outer barrel 17. In the present embodiment, the first outer barrel 17 and the first linear movement guide barrel 20 are engaged with each other using an engaging structure to which the present invention is applied. The engaging structure includes three cut-away portions (cut-away slots) 22 (i.e., a first cut-away portion 22a, a second cut-away portion 22b and a third cut-away portion 22c), three engaging projections 23 (i.e., a first engaging projection 23a, a second engaging projection 23b and a third engaging projection 23c), front and rear flanges 21a and 21b, and a circumferential groove 21c. With the engaging structure, the first outer barrel 17 and the first linear movement guide ring 20 are connected at their rear ends so that the first outer barrel 17 is rotatable relative to the first linear movement guide ring 20 about the optical axis O without being movable relative to each other along the optical axis O. The details of the engaging structure will be discussed later.

The first linear movement guide ring 20 is provided at the rear end thereof with three guide projections 24 at different circumferential positions. Each guide projection 24 projects outwardly in a radial direction. The guide projections 24 are fitted in the linear guide grooves 15 formed on the inner peripheral surface of the stationary barrel 13, respectively. Consequently, the first linear movement guide ring 20 is movable together with the first outer barrel 17 in the direction of the optical axis O without rotating relative to the stationary barrel 13 about the optical axis O. Namely, the first linear movement guide ring 20 is guided linearly in the direction of the optical axis O without rotating about the optical axis O relative to the stationary barrel 13.

A first extension stage of the zoom lens barrel 10 is composed of the first outer barrel 17 and the first linear movement guide ring 20. In the first extension stage, when the zoom gear 16 is rotated in a predetermined direction by the zoom motor M, the first outer barrel 17 is rotated through the zoom gear 16 and the outer peripheral gear 19, so that the first outer barrel 17 is advanced from the stationary barrel 13 in accordance with the relationship between the female helicoid 14 and the male helicoid 18. At the same time, since the first outer barrel 17 and the first linear movement guide ring 20 are engaged with each other through the aforementioned engaging structure so that the first outer barrel 17 is rotatable relative to the first linear movement guide ring 20 about the optical axis O without being movable relative to each other along the optical axis O, the first linear movement guide ring 20 is moved together with the first outer barrel 17 relative to the stationary barrel 13 in the direction of the optical axis O while being linearly guided.

The first linear movement guide ring 20 is provided on its inner peripheral surface with a female helicoid 27 whose direction of inclination is the same as that of the female helicoid 14. The first linear movement guide ring 20 is also provided on its inner peripheral surface with three linear guide grooves 28 that extend in parallel with the optical axis O and that are spaced from one another at an equi-angular distance in the circumferential direction.

A drive cam ring 30 is fitted in the first linear movement guide ring 20 such that a male helicoid 29 formed on the outer peripheral surface of the drive cam ring 30 is in mesh with the female helicoid 27 of the first linear movement guide ring 20. The male helicoid 29 is formed entirely on the outer peripheral surface of the drive cam ring 30. The drive cam ring 30 is further provided on its entire inner peripheral surface with a female helicoid 31 whose direction of inclination is opposite to that of the male helicoid 29.

A second linear movement guide ring 33 is positioned in the drive cam ring 30. In the present embodiment, the drive cam ring 30 and the second linear movement guide ring 33 are engaged with each other using an engaging structure to which the present invention is applied, similarly to the aforementioned engaging structure for engaging the first outer barrel 17 with the first linear movement guide barrel 20. The engaging structure for engaging the drive cam ring 30 with the second linear movement guide ring 33 includes three engaging projections 32 (i.e., a first engaging projection 32a, a second engaging projection 32b and a third engaging projection 32c), front and rear flanges 34a and 34b, a circumferential groove 34c, and three cut-away portions (cut-away slots) 35 (i.e., a first cut-away portion 35a, a second cut-away portion 35b and a third cut-away portion 35c). With the engaging structure, the drive cam ring 30 and the second linear movement guide ring 33 are connected at their rear ends so that the drive cam ring 30 is rotatable relative to the second linear movement guide ring 33 about the optical axis O without being movable relative to each other along the optical axis O. The details of the engaging structure will be discussed later.

The second linear movement guide ring 33 is provided at the rear end thereof with three guide projections 36 at different circumferential positions. Each guide projection 36 projects outwardly in a radial direction. The three guide projections 36 are fitted in three linear guide grooves 28 formed on the inner peripheral surface of the first linear movement guide ring 20, respectively. Consequently, the second linear movement guide ring 33 is linearly guided in the direction of the optical axis O through the first linear movement guide ring 20, without rotating relative to the stationary barrel 13.

The second outer barrel 40 is positioned between the first outer barrel 17 and the first linear movement guide ring 20. The second outer barrel 40 is provided, on its outer peripheral surface at the rear end thereof, with three projections 41 (there is only one of them seen in FIG. 4) which are fitted in three grooves 17a (there is only one of them seen in FIG. 1) formed on the inner peripheral surface of the first outer barrel 17, respectively. Each groove 17a extends in parallel with the optical axis O. Through the engagement of the projections 41 with the grooves 17a, the second outer barrel 40 is not rotatable relative to the first outer barrel 17 about the optical axis O but is movable relative to the first outer barrel 17 in the direction of the optical axis O.

The drive cam ring 30 is provided at its front end thereof with a rib 37 having a predetermined thickness in the radial direction. The rib is provided with three cut-away portions 38. The second outer barrel 40 is provided, on its inner peripheral surface at the front end thereof, with three engaging projections 39 (there is only one of them seen in FIG. 1) that are respectively engaged in the cut-away portions 38 of the rib 37. Through the engagement of the engaging projections 39 with the cut-away portions 38, the drive cam ring 30 and the second outer barrel 40 are connected so as not to move relative to each other in the direction of the optical axis O nor rotate relative to each other about the optical axis O. A ring 42 is fixed at the front end the second outer barrel 40 so as not to disengage the engaging projections 39 from the cut-away portions 38.

Consequently, when the first outer barrel 17 rotates about the optical axis O in a rotational direction to advance from the stationary barrel 13, the second outer barrel 40 rotates together with the first outer barrel 17, so that the rotation of the first outer barrel 17 is transmitted to the drive cam ring 30 through the engaging projections 39 and the cut-away portions 38.

A second extension stage of the zoom lens barrel 10 is composed of the drive cam ring 30, the second linear movement guide ring 33 and the second outer barrel 40. When the first outer barrel 17, which is a fundamental element of the first extension stage of the zoom lens barrel 10, is driven to rotate and advance from the stationary barrel 13, the second outer barrel 40 rotates together with the first outer barrel 17 through the engagement of the grooves 17a and the projections 41. The drive cam ring 30 to which the rotation of the second outer barrel 40 is transmitted is advanced from the first linear movement guide ring 20 together with the second outer barrel 40, while rotating relative to the stationary barrel 13 in the same rotational direction as that of the first outer barrel 17, in accordance with the engagement of the female helicoid 27 with the male helicoid 29. At the same time, the second linear movement guide ring 33 is moved in the direction of the optical axis O together with the drive cam ring 30 while being guided by the first linear movement guide ring 20 in accordance with the engagement of the guide projections 36 with the linear guide grooves 28.

The third outer barrel 45 is fitted in the drive cam ring 30. The second linear movement guide ring 33 is fitted in the third outer barrel 45. The second linear movement guide ring 33 is provided on its outer peripheral surface with three guide rails 33a (there are only two of them seen in FIG. 4) each extending parallel with the optical axis O. The third outer barrel 45 is provided on its inner peripheral surface with three guide rails 45a (there is only one of them seen in FIG. 4) each extending parallel with the optical axis O. The guide rails 33a of the second linear movement guide ring 33 are slidably engaged with the guide rails 45a of the third outer barrel 45, respectively, to thereby linearly guide the third outer barrel 45 in the direction of the optical axis O relative to the second linear movement guide ring 33.

The third outer barrel 45 is provided on its outer peripheral surface at the rear end thereof with a male helicoid 46 which meshes with the female helicoid 31 of the drive cam ring 30. Since the third outer barrel 45 is linearly guided in the direction of the optical axis O by the second linear movement guide ring 33, when the drive cam ring 30 rotates while advancing, the third outer barrel 45 does not rotate with the drive cam ring 30 but is advanced from the drive cam ring 30 due to the engagement of the male helicoid 46 with the female helicoid 31. Accordingly, a third extension stage of the lens barrel is comprised of the third outer barrel 45. The width of the male helicoid 46 in the direction of the optical axis O is determined such that the male helicoid 46 is not externally exposed when the third outer barrel 45 is fully extended.

A first lens frame 47 which holds the first lens group L1 is secured to the third outer barrel 45 to be positioned thereinside.

The second linear movement guide ring 33 is provided with three guide slits 50a and three guide slits 50b which all extends in parallel with the optical axis O. The guide slits 50a are formed so as to guide the second lens group L2 while the guide slits 50b are formed so as to guide the third lens group L3. The guide slits 50a and 50b are alternately arranged in the circumferential direction.

The second lens group L2 is supported by a second lens frame 48a which is an element of a second lens group drive unit 48. The third lens group L3 is supported by a third lens frame 49a supported by a frame supporting ring 49. The second lens group drive unit 48 is provided with three sliding plates 51 (there are only two of them seen in FIG. 4) each extending in parallel with the optical axis O. The three sliding plates 51 are slidably fitted in the three guide slits 50a. Likewise, the frame supporting ring 49 is provided with three sliding plates 52 each extending in parallel with the optical axis O. The three sliding plates 52 are slidably fitted in the three guide slits 50b. Therefore, the second lens group drive unit 48, which includes the second lens frame 48a, and the frame supporting ring 49, which includes the third lens frame 49a, is movable, independent of each other, within the second linear movement guide ring 33 in the direction of the optical axis O. A compression spring 56 is positioned between the second lens group drive unit 48 and the frame supporting ring 49 so that a shutter block 53 and the third lens frame 49a are biased forward and rearward in the direction of the optical axis O, respectively.

The second lens group drive unit 48 and the frame supporting ring 49 are moved relative to each other in the direction of the optical axis O in a predetermined relationship in accordance with an advancing movement of the zoom lens barrel 10. Each sliding plate 51 of the second lens group drive unit 48 is provided with a guide pin 58, while each sliding plates 52 of the frame supporting ring 49 is provided with a guide pin 59. The drive cam ring 30 is provided on its inner peripheral surface with six cam grooves (not shown) in which the guide pins 58 and 59 are respectively fitted. These cam grooves are each formed by cutting away part of the female helicoid 31. The guide pins 58 and 59 are slidably fitted in the corresponding cam grooves. The cam grooves for the guide pins 58 and the cam grooves for the guide pins 59 extend obliquely relative to the optical axis O. Therefore, when the drive cam ring 30 rotates relative to the second linear movement guide ring 33 bout the optical axis O, the second and third lens groups 2 and L3 are moved relative to each other along the optical axis O through the guide pins 58 and 59.

The second lens group drive unit 48 is provided with the aforementioned shutter block 53. The shutter block 53 is provided on its inner peripheral surface with a male thread with which a male thread 48b formed on an outer peripheral surface of the second lens frame 48a is engaged. The shutter block 53 is provided with a focusing motor (not shown) which, upon focusing, drives the second lens frame 48a to rotate about the optical axis O relative to the second lens group drive unit 48 in accordance with an object distance signal input from a focusing device (not shown) and a current focal length signal, which causes the second lens frame 48a (the second lens group L2) to move along the optical axis O relative to the shutter block 53 due to the engagement of the female thread 53a and the male thread 48b to bring a subject into focus. The shutter block 53 is provided with a set of shutter blades 55 which also functions an iris diaphragm. The set of shutter blades 55 opens and shuts in accordance with an object brightness signal. The shutter block 53 receives respective drive signals for driving the shutter blades 55 and for driving the second lens frame 48a for focusing, through an FPC (Flexible Printed Circuit) board 60.

The zoom lens barrel 10 is provided in the first extension stage with a focal length detector (encoder). This focal length detector is composed of a code sheet 80 attached to an outer peripheral surface of the first linear movement guide ring 20, and a conductive brush 70 which is fixed to the first outer barrel 17 to slidably contact the code sheet 80. The code sheet 80 is formed as a long strip which extends circumferentially on the first linear movement guide ring 20. When the first outer barrel 17 and the first linear movement guide ring 20 are rotated relative to each other about the optical axis O due to the zooming operation, the conductive brush 70 slides on the code sheet 80 to detect focal length information.

The FPC strip 60 is composed of a shutter substrate 60a connected to the shutter block 53 and a code plate substrate 60b connected to the code sheet 80. The FPC strip has a length long enough to permit the extension and retraction of the zoom lens barrel 10. The other terminals of the FPC strip 60 are connected to a CPU (not shown) provided within the camera body.

The zoom lens barrel 10 operates as follows. In the case where the zoom motor M is driven in the extension direction of the zoom lens barrel 10 in the retracted position shown in FIG. 1 or in the wide-angle extremity shown in FIG. 2, the first outer barrel 17 is rotated and advanced from the stationary barrel 13. Consequently, the first linear movement guide ring 20 is moved forwardly together with the first outer barrel 17 while being linearly guided by the stationary barrel 13. As a result, the drive cam ring 30 is advanced together with the second outer barrel 40 from the first linear movement guide ring 20 while rotating in the same direction as that of the first outer barrel 17. At the same time, the linear movement of the second linear movement guide ring 33 in the direction of the optical axis O, together with the drive cam ring 30 occurs. When the drive cam ring 30 advances while rotating, the second lens group L2 and the third lens group L3 are moved forwardly in the direction of the optical axis O while varying the distance between the second and third lens groups L2 and L3 within the second extension stage, in accordance with the engagement of the guide pins 58 and 59 with the corresponding cam grooves of the drive cam ring 30. Further, the third outer barrel 45 which is linearly guided by the second linear movement guide ring 33 is moved forwardly in the direction of the optical axis O in accordance with the rotation of the drive cam ring 30, so that the first lens group L1 is moved forwardly relative to the second and third lens groups L2 and L3. In the case where the zoom motor M is driven in the retraction direction of the zoom lens barrel 10 when it is positioned at the telephoto extremity shown in FIG. 3, the zoom lens barrel 10 operates in the opposite way to the above-mentioned operation.

As can be seen from the foregoing, in the three extension stage type of zoom lens barrel 10, the zooming operation is carried out by varying the distances of the first, second and third lens groups L1, L2 and L3 from the film surface F while varying the relative distances among the lens groups L1, L2 and L3, and the focusing operation is carried out by moving the second lens group L2 in the direction of the optical axis O by means of the focusing motor M.

Figure 8:
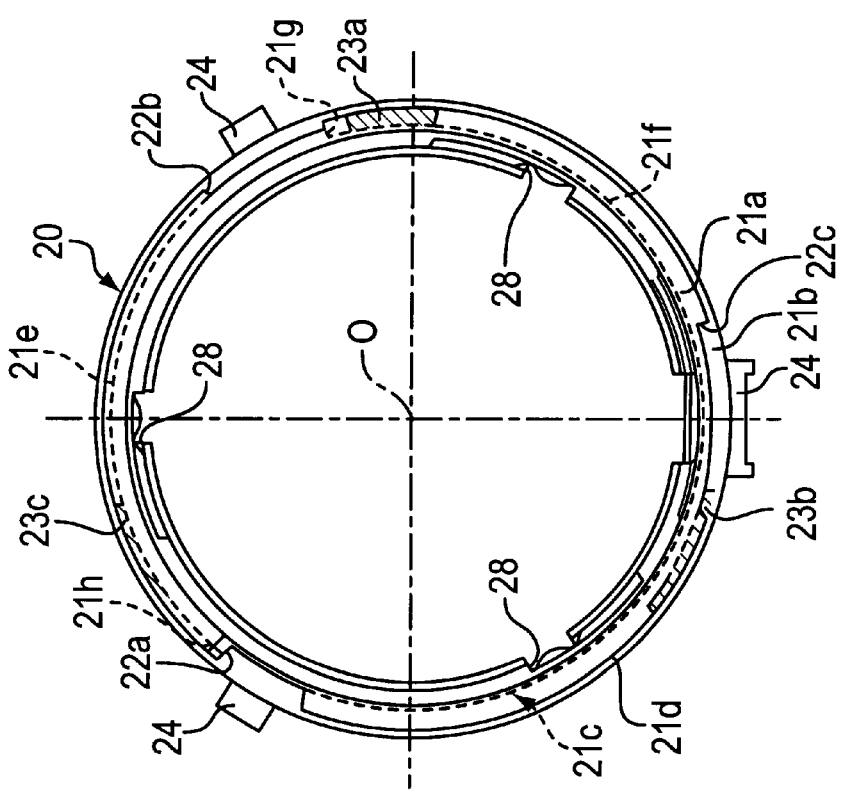
FIG. 8 is a cross sectional view of the first outer barrel and the first linear movement guide ring in the fully extended state of the zoom lens barrel.
Figure 9:
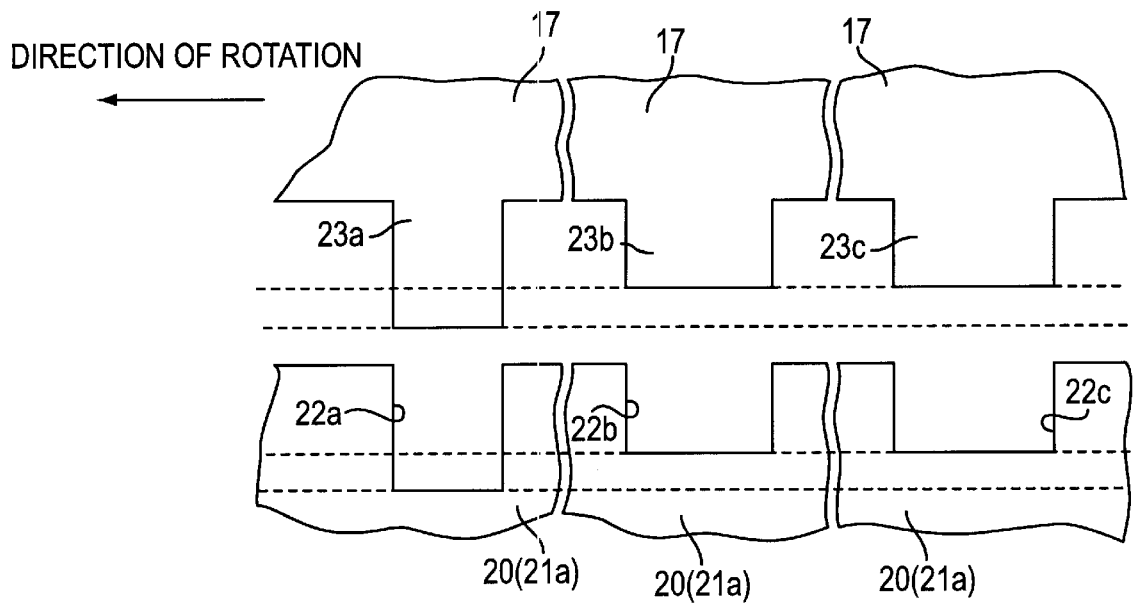
FIG. 9 is an explanatory developed view of three engaging projections of the first outer barrel and three cut-away portions of the first linear movement guide ring.

As mentioned above, the first outer barrel 17 and the first linear movement guide ring 20 are engaged with each other through the engaging projections 23a, 23b and 23c so that the former is rotatable relative to the latter about the optical axis O, while the drive cam ring 30 and the second linear movement guide ring 33 are engaged with each other through the engaging projections 32a, 32b and 32c so that the former is rotatable relative to the latter about the optical axis O. In order for the zoom lens barrel 10 to fully extend from the retracted position to the telephoto-extremity position (fully extended position) thereof, the first outer barrel 17 and the drive cam ring 30 need to rotate relative to the first linear movement guide ring 20 and the second linear movement guide ring 33 by an angle of rotational of over 180 degrees, respectively. First of all, the engaging structure (first engaging structure) for engaging the first outer barrel 17 with the first linear movement guide ring 20 will be hereinafter discussed with reference to FIGS. 5 through 9. FIG. 9 shows an explanatory developed view of respective engaging portions of the first outer barrel 17 and the first linear movement guide ring 20. It should be noted that the shapes of the engaging projections 23a, 23b and 23c and the cut-away portions 22a, 22b and 22c shown in FIG. 9 are slightly different from their actual shapes for the purpose of illustration. The right and left direction (horizontal direction) of FIG. 9 represents the circumferential direction or rotational direction of the first outer barrel 17 or the first linear movement guide ring 20, while the up and down direction (vertical direction) of FIG. 9 represents a radial direction of the first outer barrel 17 or the first linear movement guide ring 20.

The first linear movement guide ring 20 is provided at the rear end thereof with the front and rear flanges 21a and 21b, as mentioned above. The circumferential groove 21c which extends about the optical axis O in a circumference of the first linear movement guide ring 20 is formed between the front and rear flanges 21a and 21b. The front flange 21a is provided with the cut-away portions 22a, 22b and 22c through which the engaging projections 23a, 23b and 23c can enter the circumferential groove 21c in the direction of the optical axis O, respectively. The cut-away portions 22a, 22b and 22c are formed on the front flange 21a substantially at regular intervals in a circumferential direction thereof. As can be clearly seen in FIG. 9, the widths of the cut-away portions 22a, 22b and 22c are different from each other in the circumferential direction. The width of the third cut-away portion 22c is the greatest while the width of the first cut-away portion 22a is the least among all the three cut-away portions in the circumferential direction. On the other hand, the depths of the second and third cut-away portions 22b and 22c are identical but the depth of the first cut-away portion 22a is greater than those of the second and third cut-away portions 22b and 22c.

The outermost surface 21d of the front flange 21a slidably contacts the inner peripheral surface of the first outer barrel 17 at the rear end thereof to provide concentric guiding between the first outer barrel 17 and the first linear movement guide ring 20.

The first outer barrel 17 is provided on its inner peripheral surface at the rear end thereof with the engaging projections 23a, 23b and 23c, each extending inwardly in a radial direction of the first outer barrel 17. The engaging projections 23a, 23b and 23c are formed at specific positions on the first outer barrel 17 so as to correspond to the cut-away portions 22a, 22b and 22c, respectively. The thickness of each engaging projection 23a, 23b, 23c in the axial direction of the first outer barrel 17 is determined so that each projection 23a, 23b, 23c can be slidably fitted in the circumferential groove 21c without yielding any substantial play therein in the direction of the optical axis O. Therefore, after the engaging projections 23a, 23b, 23c are inserted into the circumferential groove 21c through the cut-away portions 22a, 22b and 22c, the first outer barrel 17 can rotate about the optical axis O relative to the first linear movement guide ring 20 and can be rendered immovable in the axial direction relative to the first linear movement guide ring 20.

As can be seen in FIG. 9, the widths of the engaging projections 23a, 23b and 23c are different from each other in the circumferential direction of the first outer barrel 17 to correspond to the widths of the cut-away portions 22a, 22b and 22c, respectively. Namely, the widths of the engaging projections 23a, 23b and 23c correspond to those of the cut-away portions 22a, 22b and 22c in the circumferential direction, respectively. Likewise, the heights of the engaging projections 23a, 23b and 23c in the radial direction correspond to the depths of the cut-away portions 22a, 22b and 22c in a radial direction, respectively. With such dimensions of the engaging projections 23a, 23b and 23c and the cut-away portions 22a, 22b and 22c, the first engaging projection 23a, whose height is greater than those of the other two engaging projections 23b and 23c, can be inserted into the circumferential groove 21c only through the corresponding first cut-away portion 22a, whose depth corresponds to the height of the first engaging projection 23a.

Consequently, the first outer barrel 17 and the first linear movement guide ring 20 can be axially engaged with each other only when the engaging projections 23a, 23b and 23c face the cut-away portions 22a, 22b and 22c in the direction of the common axis, respectively, as shown in FIG. 9.

Figure 7:
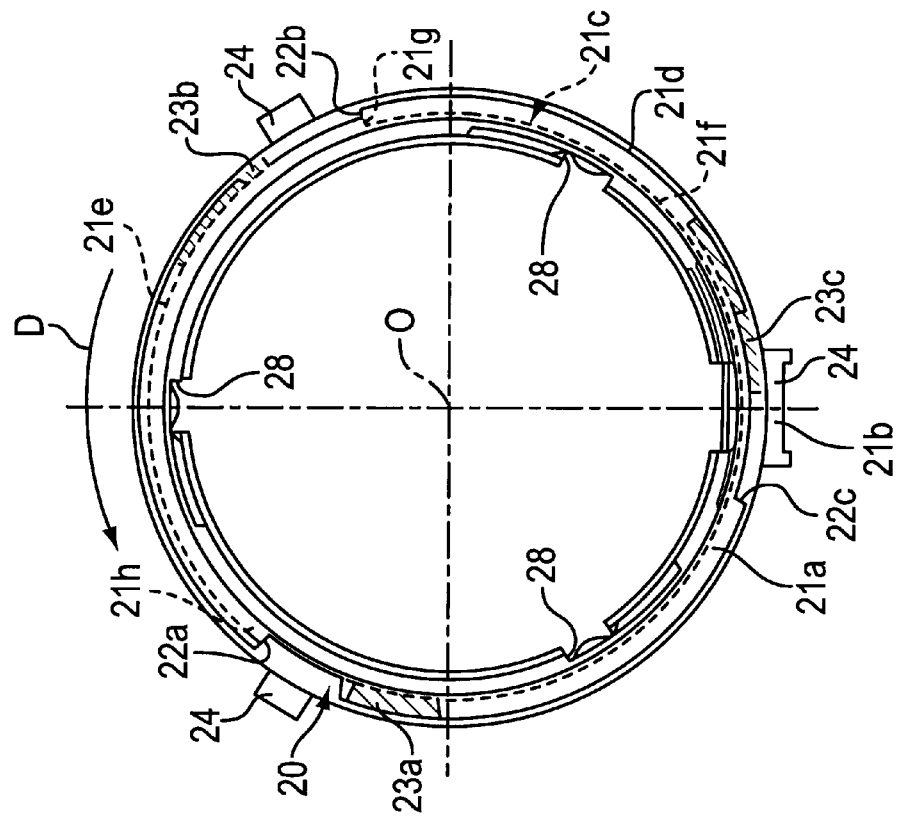
FIG. 7 is a cross sectional view of the first outer barrel and the first linear movement guide ring in the retracted state of the zoom lens barrel.

FIG. 7 shows the first outer barrel 17 and the first linear movement guide ring 20 in the retracted state of the zoom lens barrel 10. This state shown in FIG. 7 is that after the first outer barrel 17 has been rotated by a certain degree about the optical axis O relative to the first linear movement guide ring 20 after the engaging projections 23a, 23b and 23c are inserted in the circumferential groove 21c through the cut-away portions 22a, 22b and 22c, respectively. In FIGS. 7 and 8, the hatched portions represent the engaging projections 23a, 23b and 23c. A broken line represents the bottom of the groove 21c. As can be seen from the broken line, the groove 21c is formed as a stepped groove in the radial direction. Namely, the groove 21c is composed of a large-radius groove 21e and a small-radius groove 21f. The large-radius groove 21e extends approximately by an angle of 120 degrees about the optical axis O, while the small-radius groove 21f extends approximately by an angle of 240 degrees about the optical axis O. Two stepped portions 21g and 21h are formed at corresponding connecting ends of the large-radius groove 21e and the small-radius groove 21f. The stepped portion 21g is positioned to correspond to that end of the second cut-away portion 22b which is closer to the third cut-away portion 22c, while the stepped portion 21h is positioned to substantially correspond to that end of the first cut-away portion 22a which is closer to the second cut-away portion 22b. The large-radius groove 21e is formed so that the innermost surface of each of the second and third engaging projections 23b and 23c (short projection) can slidably contact the bottom of the large-radius groove 21e, and the small-radius groove 21f is formed so that the innermost surface of the first engaging projection 23a (long projection) can slidably contact the bottom of the small-radius groove 21f. Therefore, neither the second engaging projection 23b nor the third engaging projection 23c contacts the bottom of the small-radius groove 21f while the first outer barrel 17 rotates about the first linear movement guide ring 20.

An arrow D shown in FIG. 7 represents the rotational direction of the first outer barrel 17 relative to the first linear movement guide ring 20 when the zoom lens barrel 10 is driven to advance. The rotational direction shown by the arrow D in FIG. 7 is that of the shortest-width first engaging projection 23a proceeding towards the longest-width third cut-away portion 22c without passing by the middle-width second cut-way portion 22b.

When the zoom lens barrel 10 is driven to advance from its retracted position, the first linear movement guide ring 20 is advanced while being linearly guided through the guide projections 24 and the linear guide grooves 15; at the same time, the first outer barrel 17 rotates in the rotational direction shown by the arrow D relative to the first linear movement guide ring 20. Rotation of the first outer barrel 17 in the direction of the arrow D relative to the first linear movement guide ring 20 by a certain degree brings the second and third engaging projections 23b and 23c to face the first and second cut-away portions 22a and 22b, respectively. In this state, since the second engaging projection 23b and the third engaging projection 23c are greater in width in the circumferential direction than the first and second cut-away portions 22a and 22b, respectively, the second engaging projection 23b and the third engaging projection 23c do not disengage from the circumferential groove 21c through the first and second cut-away portions 22a and 22b, respectively. Furthermore, in such a state, although the first engaging projection 23a faces the third cut-away portion 22c, the first engaging projection 23a does not disengage from the circumferential groove 21c through the third cut-away portion 22c because the height of the first engaging projection 23a is greater than the depth of the third cut-away portion 22c, though the first engaging projection 23a is less than the third cut-away portion 22c in width in the circumferential direction. Accordingly, the first outer barrel 17 does not disengage from the first linear movement guide ring 20 when the first, second and third engaging projections 23a, 23b and 23c face the third, first and second cut-away portions 22c, 22a and 22b, respectively.

Figure 3:
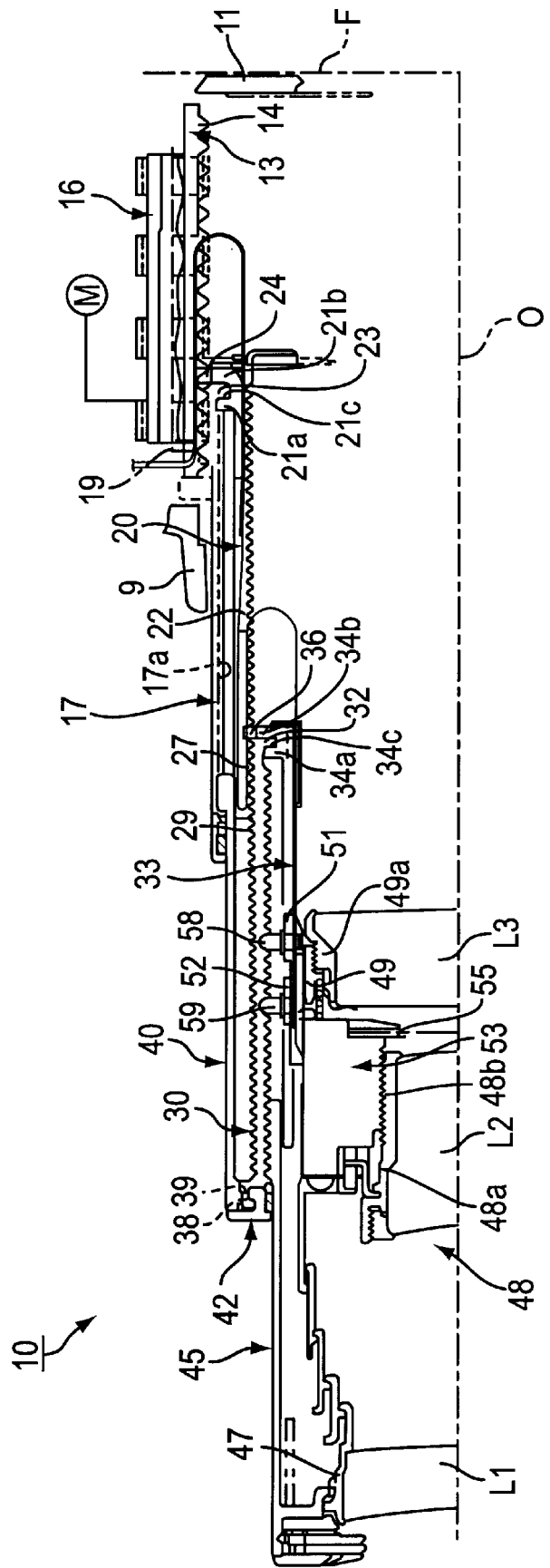
FIG. 3 is a longitudinal sectional view of the zoom lens barrel shown in FIG. 1, at a telephoto extremity.
Figure 4:
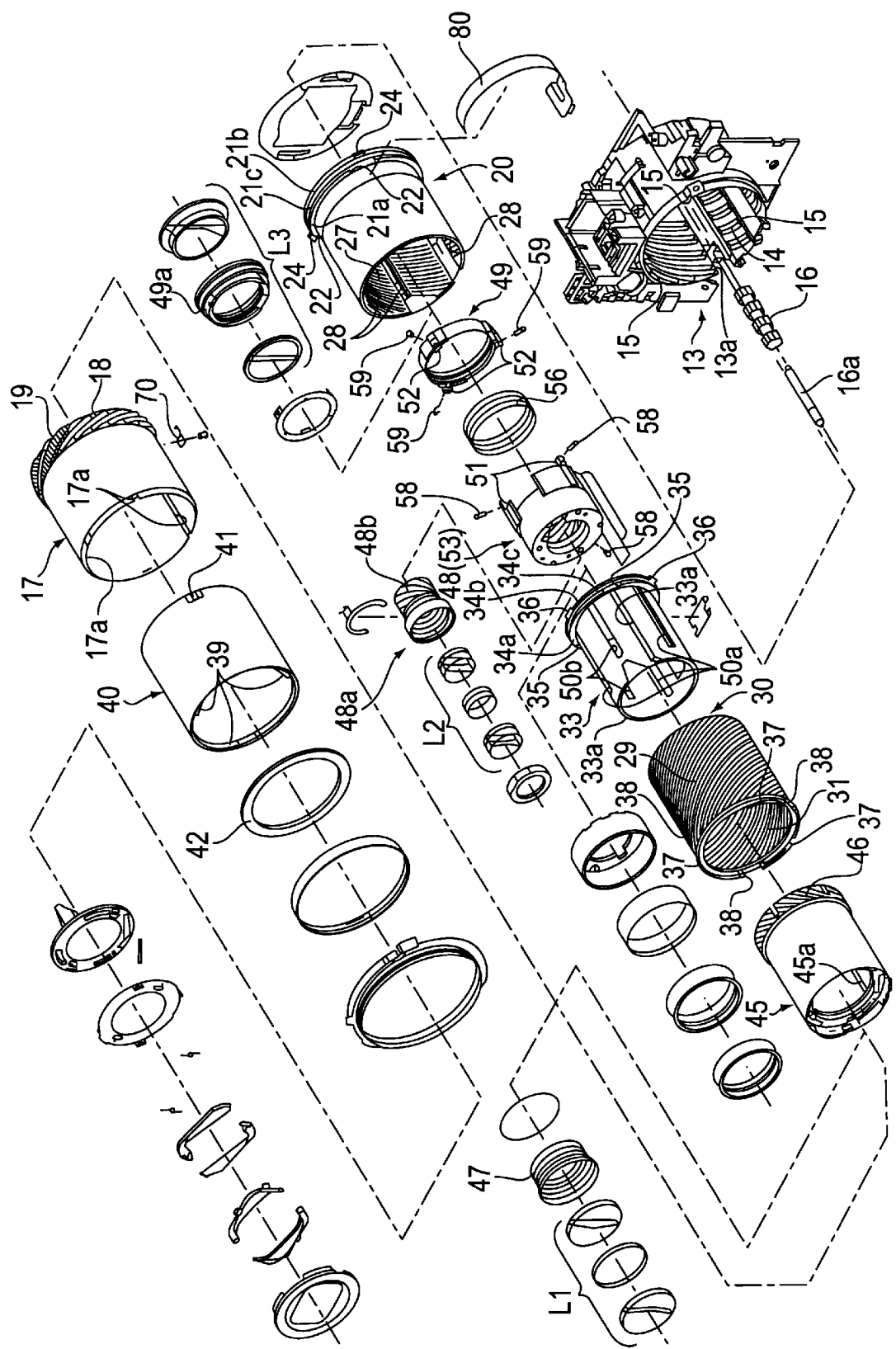
FIG. 4 is an exploded perspective view of the zoom lens barrel shown in FIG. 1.
Figure 6:
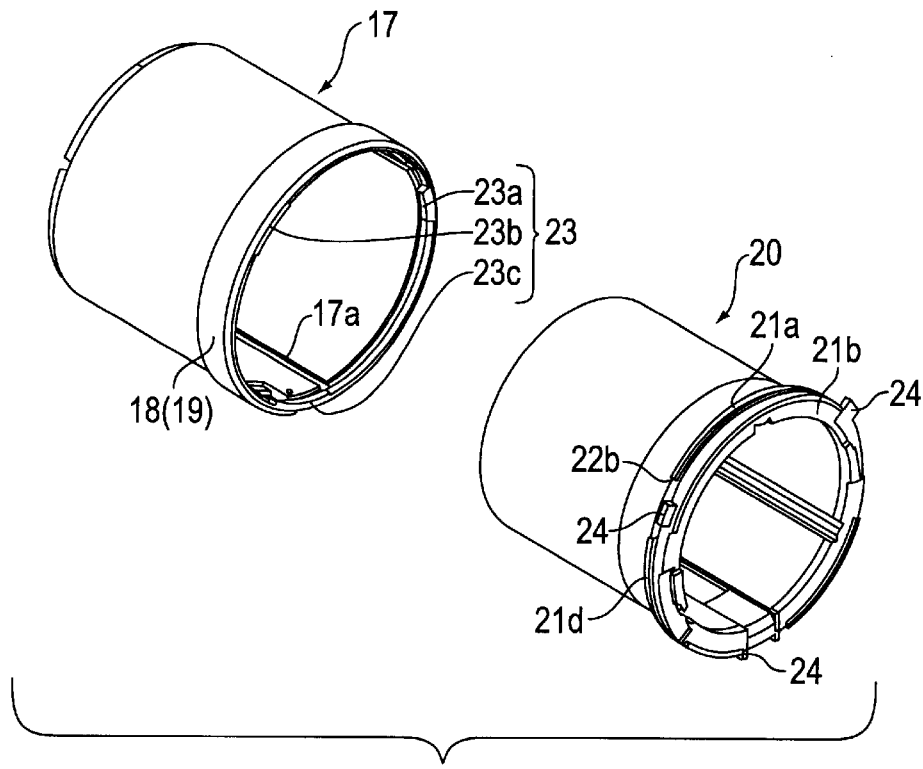
FIG. 6 is an exploded perspective view of the first outer barrel and the first linear movement guide ring shown in FIG. 5 which are seen from a different angle of view.
Figure 5:
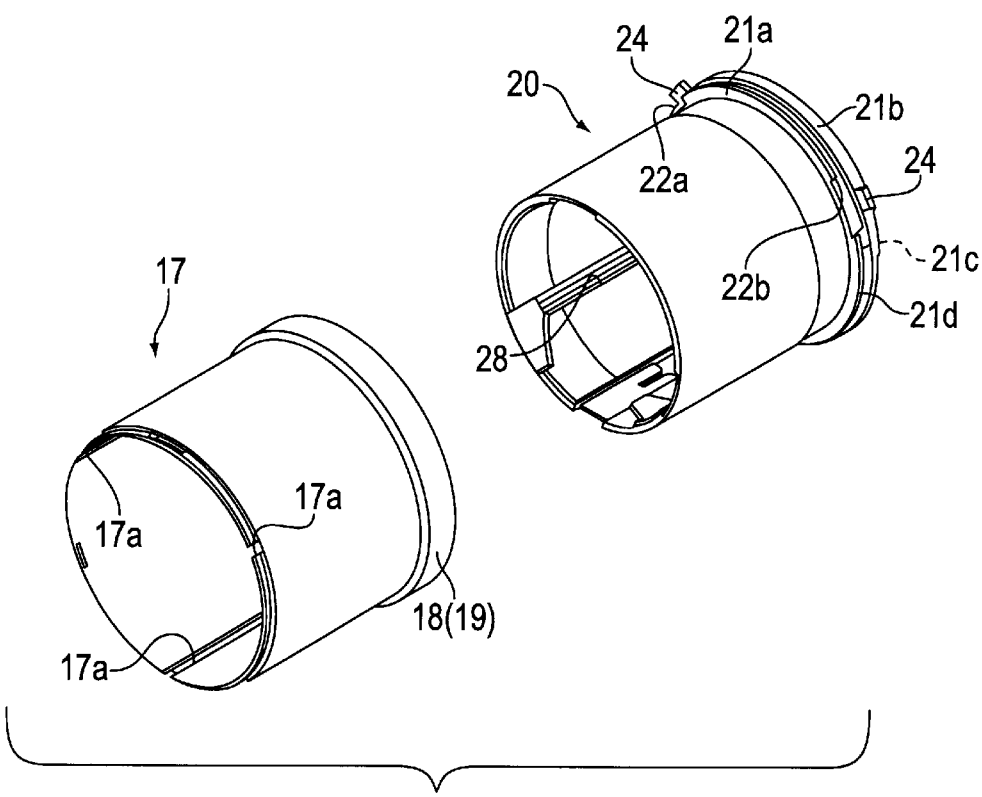
FIG. 5 is an exploded perspective view of a first outer barrel and a first linear movement guide ring in the zoom lens barrel shown in FIG. 4.

When the zoom lens barrel 10 is at the telephoto-extremity as shown in FIG. 3, the first outer barrel 17 and the first linear movement guide ring 20 are positioned as shown in FIG. 8. When the first outer barrel 17 further rotates in the rotational direction of the arrow D (in the counterclockwise direction in FIG. 8) from the position shown in FIG. 8, the first engaging projection 23a butts against the stepped portion 21g. Accordingly, the stepped portion 21g functions as a stopper for preventing the first outer barrel 17 to further rotate in the rotational direction of the arrow D (in the counterclockwise direction in FIG. 8) approximately from the position shown in FIG. 8. As can be understood from FIGS. 7 and 8, when the zoom lens barrel 10 is driven to advance from the retracted position to the telephoto-extremity, the first outer barrel 17 rotates by an angle of rotation of over 180 degrees. During the rotation, none of the engaging projections 23a, 23b and 23c disengage from the circumferential groove 21c.

Figure 16:
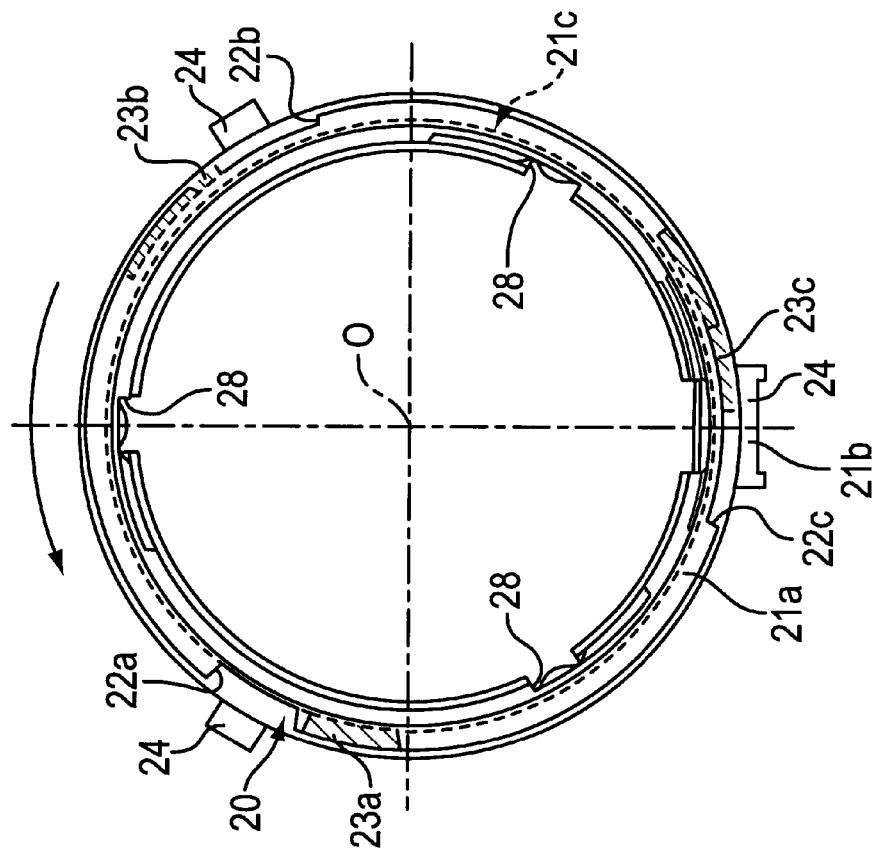
FIG. 16 is a cross sectional view of the first outer barrel and the first linear movement guide ring in the retracted state of the zoom lens barrel, showing the case where a circumferential groove formed on the first linear movement guide ring is a simple circular groove.
Figure 17:
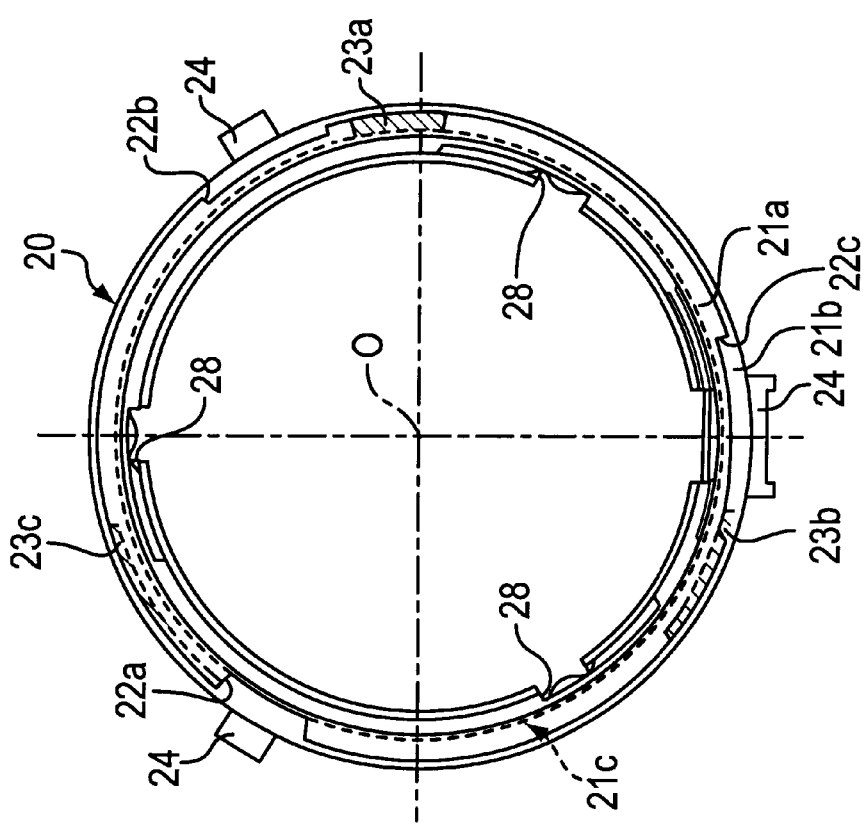
FIG. 17 is a cross sectional view of the first outer barrel and the first linear movement guide ring in the fully extended state of the zoom lens barrel shown in FIG. 16.

The groove 21c can be formed as a simple circular groove. In this case, the circular groove is formed to have the same radius of curvature as that of the aforementioned small-radius groove 21f, and a stopper (not shown) for preventing the first outer barrel 17 from further rotating in the rotational direction of the arrow D (in the counterclockwise direction in FIG. 8), approximately from the position shown in FIG. 8, is provided between the first outer barrel 17 and the first linear movement guide ring 20. FIGS. 16 and 17 show such a case where the groove 21c is formed as a simple circular groove. FIGS. 16 and 17 respectively correspond to FIGS. 7 and 8.

If the heights of the engaging projections and the depths of the cut-away portions are all the same, the first engaging projection 23a is not engaged with the front flange 21a at all, in either the radial or circumferential direction, when the first engaging projection 23a faces the third cut-away portion 22c. In this state, since the second and third engaging projections 23b and 23c maintain to be engaged with the front flange 21a, there is little chance that the first outer barrel 17 disengages from the first linear movement guide ring 20. However, in such a state of engagement, where the first engaging projection 23a faces the third cut-away portion 22c, substantial play may occur due to the non-engagement-state of the first engaging projection 23a with the front flange 21a, and/or the first outer barrel 17 cannot smoothly rotate relative to the first linear movement guide ring 20 when the first engaging projection 23a passes by the third cut-away portion 22c because the first engaging projection 23a may get caught by the third cut-away portion 22c when passing thereby. However, in the illustrated embodiment, such a problem never occurs because the first engaging projection 23a is formed so that its height is greater than the depth of the third cut-away portion 22c, which makes it possible for the first engaging projection 23a to keep engaged with the circumferential groove 21c (the front flange 21a) at all times.

In the illustrated embodiment, when the first outer barrel 17 is rotated from its rotational position shown in FIG. 9 where the first outer barrel 17 can disengage from the first linear movement guide ring 20, the first outer barrel 17 is rotated so as to move the first engaging projection 23a (whose width is less than the other two engaging projection 23b and 23c in the circumferential direction of the first outer barrel 17) towards the third cut-away portion 22c (whose width is greater than the other two cut-away portions 22a and 22b in the circumferential direction of the first linear movement guide ring 20) without passing by the second cut-away portion 22b, whose width is greater than the first cut-away portions 22a but less than the third cut-away portions 22c. In other words, the first outer barrel 17 is rotated in the rotational direction (the rotational direction shown by the arrow D) of moving the three engaging projections 23a, 23b and 23c, whose widths are different stepwisely in a circumferential direction, in the direction of the third engaging projection 23c towards the first engaging projection 23a. The reason why the first outer barrel 17 is rotated in a specific rotational direction relative to the first linear movement guide ring 20 when the first outer barrel 17 is driven to advance is so that each of the engaging projections 23a, 23b and 23c does not disengage from the circumferential groove 21c during the rotation of the first outer barrel 17 at the moment each engaging projection (e.g., the third engaging projection 23c) passes by the cut-away portion (e.g., the second cut-away portion 22b), which corresponds to an adjacent engaging projection (e.g., the second engaging projection 23b). For instance, if the first outer barrel 17 is reversely rotated from its rotational position shown in FIG. 9 where the first outer barrel 17 can disengage from the first linear movement guide ring 20, the second engaging projection 23b is not engaged with the flange 21a when the second engaging projection 23b faces the third cut-away portion 22c.

Although only the case where the first outer barrel 17 is rotated relative to the first linear movement guide ring 20 in the rotational direction of advancing the zoom lens barrel 10 is discussed above, a similar effect is obtained when the first outer barrel 17 is rotated relative to the first linear movement guide ring 20 in the other rotational direction of retracting the zoom lens barrel 10 as the engaging projections 23a, 23b and 23c never face the cut-away portions 22a, 22b and 22c, respectively, once the zoom lens barrel 10 is assembled. The engaging projections 23a, 23b and 23c respectively face the cut-away portions 22a, 22b and 22c only during the assembly of the zoom lens barrel 10.

Therefore, even when the first outer barrel 17 is rotated back and forth between the retracted position shown in FIG. 7 and the telephoto-extremity position shown in FIG. 8 (i.e., when the zoom lens barrel 10 advances or retracts between the retracted position shown in FIG. 1 and the fully advanced position shown in FIG. 3) none of the engaging projections 23a, 23b and 23c disengage from the circumferential groove 21c.

The dimensions of the engaging projections 23 and the cut-away portions 22 can be modified so that the height or depth of the second engaging projection 23b and the second cut-away portion 22b are identical to the height or depth of the first engaging projection 23a and the first cut-away portion 22a, while the height or depth of the third engaging projection 23c and the third cut-away portion 22c are less than the other engaging projections or cut-away portions.

In this modified embodiment, as long as the first outer barrel 17 is rotated relative to the first linear movement guide ring 20 by the same degree of rotational angle (approximately more than 180 degrees and less than 240 degrees) as that in the previous embodiment, none of the three engaging projections 23a, 23b and 23c disengage from the circumferential groove 21c.

In the illustrated embodiment, since the groove 21c is comprised of the large-radius groove 21e and the small-radius groove 21f to form the stepped portions 21g and 21h, which function as stoppers, providing such simple stoppers between the first outer barrel 17 and the first linear movement guide ring 20 is realized in an easy manner.

The engaging structure (second engaging structure) for engaging the drive cam ring 30 with the second linear movement guide ring 33 will be hereinafter discussed with reference to FIGS. 10 through 13. Since the second engaging structure is similar to the aforementioned first engaging structure, the second engaging structure will be briefly discussed.

The second linear movement guide ring 33 is provided at its end with the front and rear flanges 34a and 34b, as mentioned before. The circumferential groove 34c which extends about the optical axis O in a circumference of the first linear movement guide ring 33 is formed between the front and rear flanges 34a and 34b. The front flange 34a is provided with the cut-away portions 35a, 35b and 35c through which the engaging projections 32a, 32b and 32c can enter the circumferential groove 21c in the direction of the optical axis O, respectively. The widths of the cut-away portions 35a, 35b and 35c are different from each other in the circumferential direction. The width of the third cut-away portion 35c is the greatest while the width of the first cut-away portion 35a is the least among all the three cut-away portions in the circumferential direction. On the other hand, the depths of the second and third cut-away portions 35b and 35c are identical but the depth of the first cut-away portion 35a is greater than those of the second and third cut-away portions 35b and 35c.

The outermost surface 34d of the front flange 34a slidably contacts the inner peripheral surface of the drive cam ring 30 at the rear end thereof to provide concentric guiding between the drive cam ring 30 and the second linear movement guide ring 33.

The drive cam ring 30 is provided on the inner peripheral surface at the rear end thereof with the engaging projections 32a, 32b and 32c, each extending inwardly in a radial direction of the drive cam ring 30. The engaging projections 32a, 32b and 32c are formed at specific positions on the drive cam ring 30, so as to correspond to the cut-away portions 35a, 35b and 35c, respectively. The thickness or length of each engaging projection 32a, 32b, 32c in the direction of the optical axis O is determined so that each projection 32a, 32b, 32c can be slidably fitted in the circumferential groove 34c without yielding any substantial play therein in the direction of the optical axis O. Therefore, after the engaging projection 32a, 32b, 32c are inserted into the circumferential groove 34c through the cut-away portions 35a, 35b and 35c, the drive cam ring 30 can rotate about the optical axis O relative to the second linear movement guide ring 33 and can be rendered immovable in the axial direction relative to the second linear movement guide ring 33.

The widths of the engaging projections 32a, 32b and 32c are different from each other in a circumferential direction of the drive cam ring 30 to correspond to the widths of the cut-away portions 35a, 35b and 35c, respectively. Namely, the widths of the engaging projections 32a, 32b and 32c correspond to those of the cut-away portions 35a, 35b and 35c in the circumferential direction, respectively. Likewise, the heights of the engaging projections 32a, 32b and 32c in the radial direction correspond to the depths of the cut-away portions 35a, 35b and 35c in the circumferential direction, respectively. With such dimensions of the engaging projections 32a, 32b and 32c and the cut-away portions 35a, 35b and 35c, the first engaging projection 32a, whose height is greater than those of the other two engaging projections 32b and 32c, can be inserted into the circumferential groove 34c through only the corresponding first cut-away portion 35a, whose depth corresponds to the height of the first engaging projection 32a.

Consequently, the drive cam ring 30 and the second linear movement guide ring 33 can be axially engaged with each other only when the engaging projections 32a, 32b and 32c face the cut-away portions 35a, 35b and 35c in the direction of the common axis, respectively.

Figure 12:
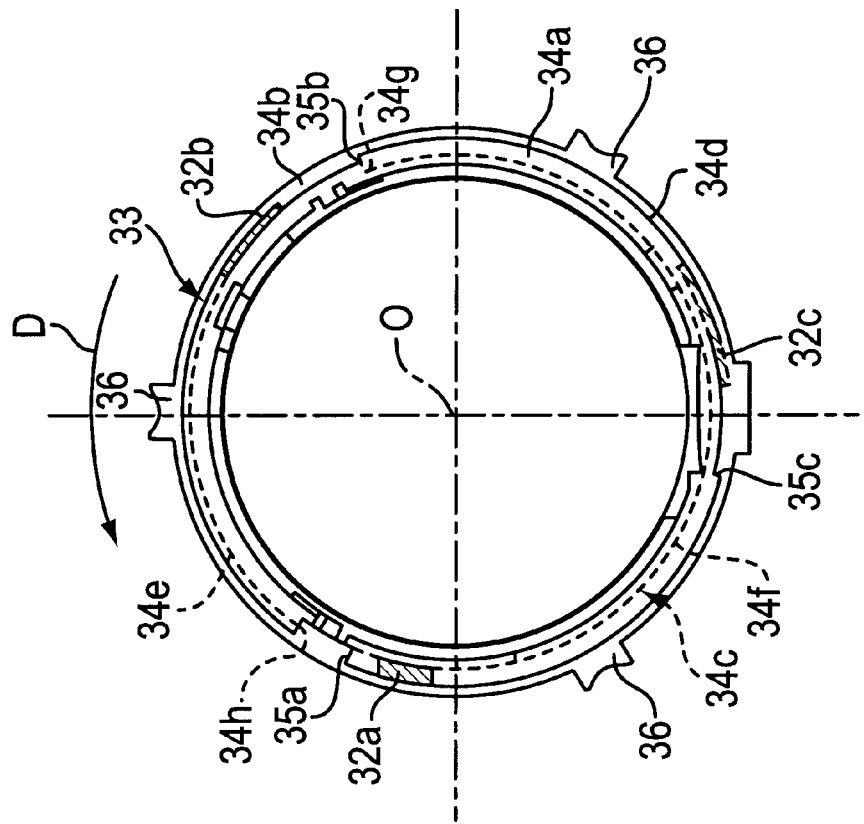
FIG. 12 is a cross sectional view of the drive cam ring and the second linear movement guide ring in the retracted state of the zoom lens barrel.
Figure 13:
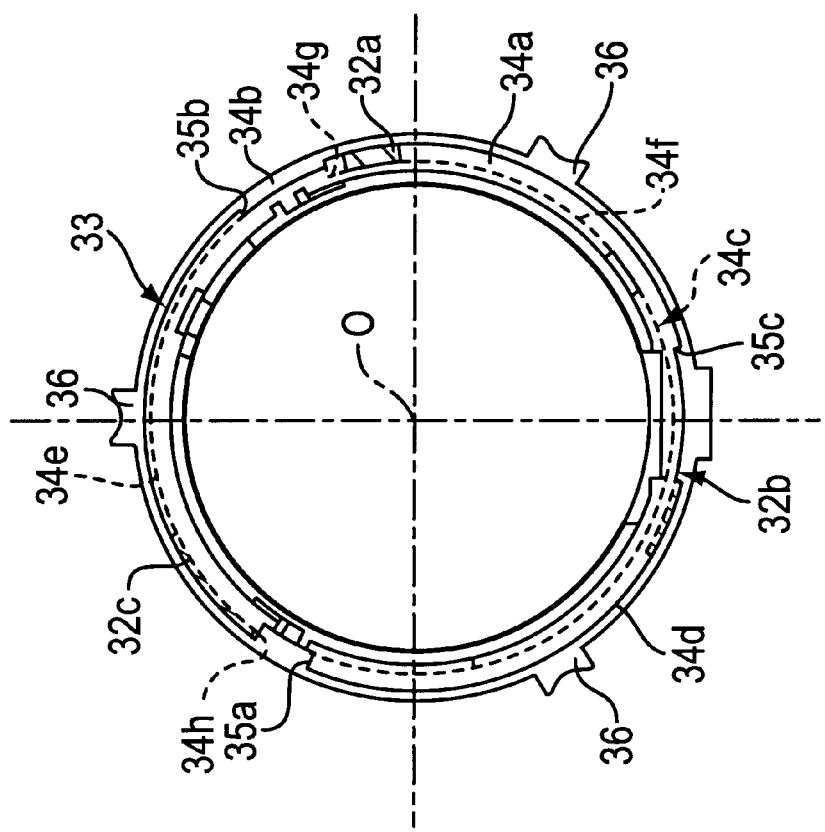
FIG. 13 is a cross sectional view of the drive cam ring and the second linear movement guide ring in the fully extended state of the zoom lens barrel.

FIG. 12 shows the drive cam ring 30 and the second linear movement guide ring 33 in the retracted state of the zoom lens barrel 10. In FIGS. 12 and 13, hatched portions represent the engaging projections 32a, 32b and 32c. A broken line represents the bottom of the groove 34c. As can be seen from the broken line, the groove 34c is formed as a stepped groove in the radial direction, similarly to the groove 21c of the first linear movement guide ring 20. Namely, the groove 34c is composed of a large-radius groove 34e and a small-radius groove 34f. The large-radius groove 34e extends approximately by an angle of 125 degrees about the optical axis O, while the small-radius groove 34f extends approximately by an angle of 235 degrees about the optical axis O. Two stepped portions 34g and 34h are formed at corresponding connecting ends of the large-radius groove 34e and the small-radius groove 34f. The stepped portion 34g is positioned to correspond to that end of the second cut-away portion 35b which is closer to the third cut-away portion 35c, while the stepped portion 34h is positioned to correspond to that end of the first cut-away portion 35a which is closer to the second cut-away portion 35b. The large-radius groove 34e is formed so that the innermost surface of each of the second and third engaging projections 32b and 32c (short projection) can slidably contact the bottom of the large-radius groove 34e, and the small-radius groove 34f is formed so that the innermost surface of the first engaging projection 32a (long projection) can slidably contact the bottom of the small-radius groove 34f. Therefore, neither the second engaging projection 32b nor the third engaging projection 32c contacts the bottom of the small-radius groove 34f while the drive cam ring 30 rotates about the second linear movement guide ring 33.

An arrow D shown in FIG. 12 represents the rotational direction of the drive cam ring 30 relative to the second linear movement guide ring 33 when the zoom lens barrel 10 is driven to advance.

When the zoom lens barrel 10 is driven to advance from its retracted position, the drive cam ring 30 is rotated relative to the second linear movement guide ring 33 in the rotational direction of the arrow D by the zoom motor M. Rotation of the drive cam ring 30 in the direction of the arrow D relative to the second linear movement guide ring 33 by a certain degree brings the second and third engaging projections 32b and 32c to face the first and second cut-away portions 35a and 35b, respectively. In this state, since the second engaging projection 32b and the third engaging projection 32c are greater in width in the circumferential direction than the first and second cut-away portions 35a and 35b, respectively, the second engaging projection 32b and the third engaging projection 32c do not disengage from the circumferential groove 34c through the first and second cut-away portions 35a and 35b, respectively; and hence, maintaining the second engaging projection 32b and the third engaging projection 32c to be positioned in the circumferential groove 34c. Furthermore, in such a state, although the first engaging projection 32a faces the third cut-away portion 35c, the first engaging projection 32a does not disengage from the circumferential groove 34c through the third cut-away portion 35c because the height of the first engaging projection 32a is greater than the depth of the third cut-away portion 35c, though the first engaging projection 32a is less than the third cut-away portion 35c in width in the circumferential direction. Accordingly, the drive cam ring 30 does not disengage from the second linear movement guide ring 33 when the first, second and third engaging projections 32a, 32b and 32c face the third, first and second cut-away portions 35c, 35a and 35b, respectively.

When the zoom lens barrel 10 is at the telephoto-extremity as shown in FIG. 3, the drive cam ring 30 and the second linear movement guide ring 33 are positioned as shown in FIG. 13. When the drive cam ring 30 further rotates in the rotational direction of the arrow D (in the counterclockwise direction in FIG. 13) from the position shown in FIG. 13, the first engaging projection 32a butts against the stepped portion 34g. Accordingly, the stepped portion 34g functions as a stopper for preventing the drive cam ring 30 to further rotate in the rotational direction of the arrow D (in the counterclockwise direction in FIG. 13) approximately from the position shown in FIG. 13.

Figure 18:
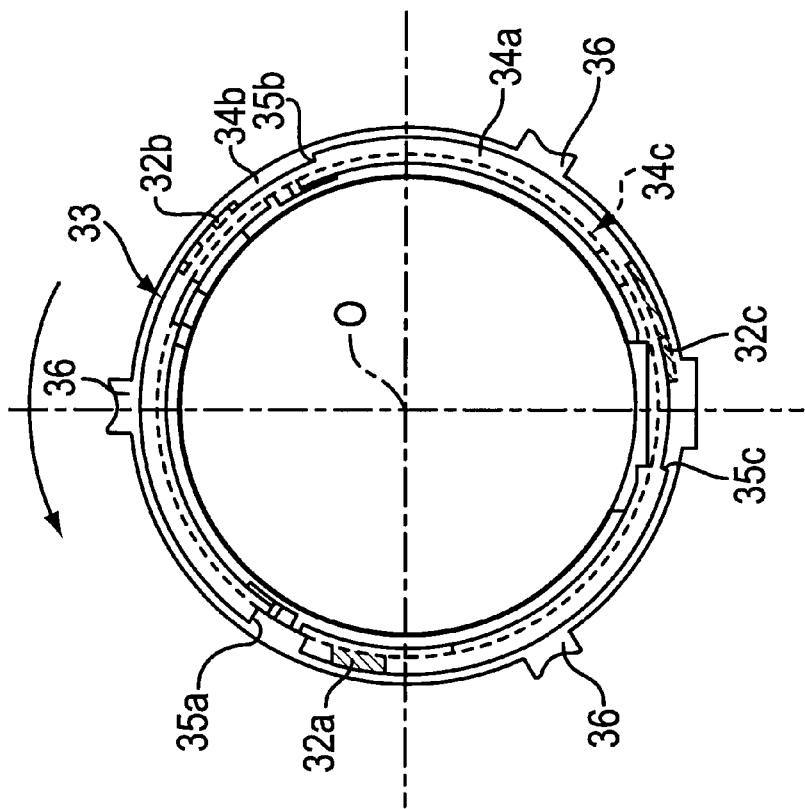
FIG. 18 is a cross sectional view of the drive cam ring and the second linear movement guide ring in the retracted state of the zoom lens barrel, showing the case where a circumferential groove formed on the second linear movement guide ring is a simple circular groove.
Figure 19:
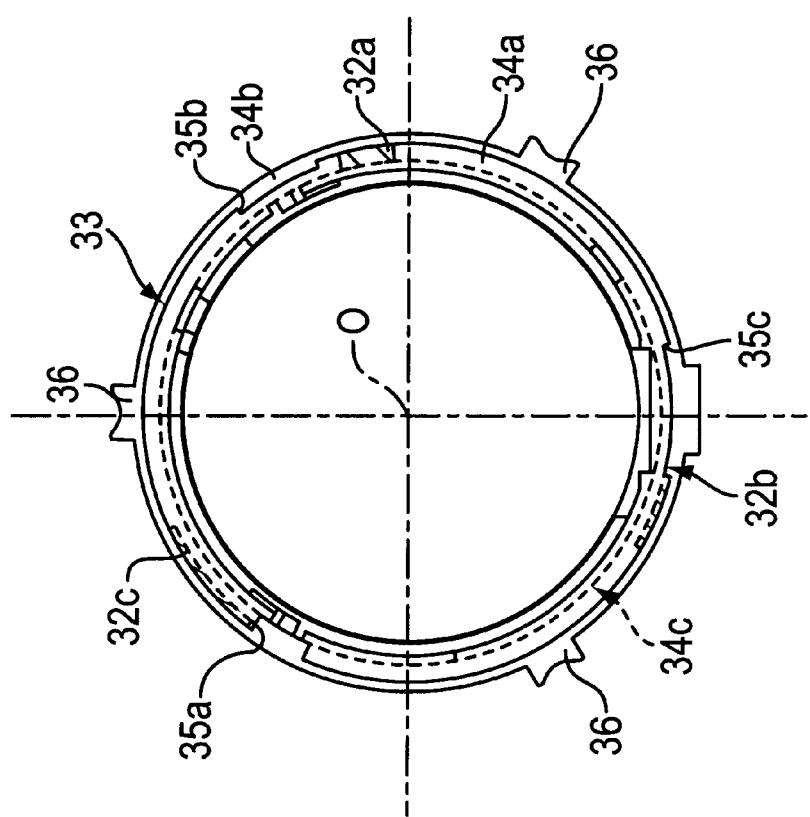
FIG. 19 is a cross sectional view of the drive cam ring and the second linear movement guide ring in the fully extended state of the zoom lens barrel shown in FIG. 18.

The groove 34c can be formed as a simple circular groove. In this case, the circular groove is formed to have the same radius of curvature as that of the aforementioned small-radius groove 34f, and a stopper (not shown) for preventing the drive cam ring 30 from further rotating in the rotational direction of the arrow D (in the counterclockwise direction in FIG. 13), approximately from the position shown in FIG. 13, is provided between the drive cam ring 30 and the second linear movement guide ring 33. FIGS. 18 and 19 show such a case where the groove 34c is formed as a simple circular groove. FIGS. 18 and 19 respectively correspond to FIGS. 12 and 13.

In the illustrated embodiment, since the groove 34c is comprised of the large-radius groove 34e and the small-radius groove 34f to form the stepped portions 34g and 34h, which function as stoppers, providing such simple stoppers between the drive cam ring 30 and the second linear movement guide ring 33 is realized in an easy manner.

Figure 14:
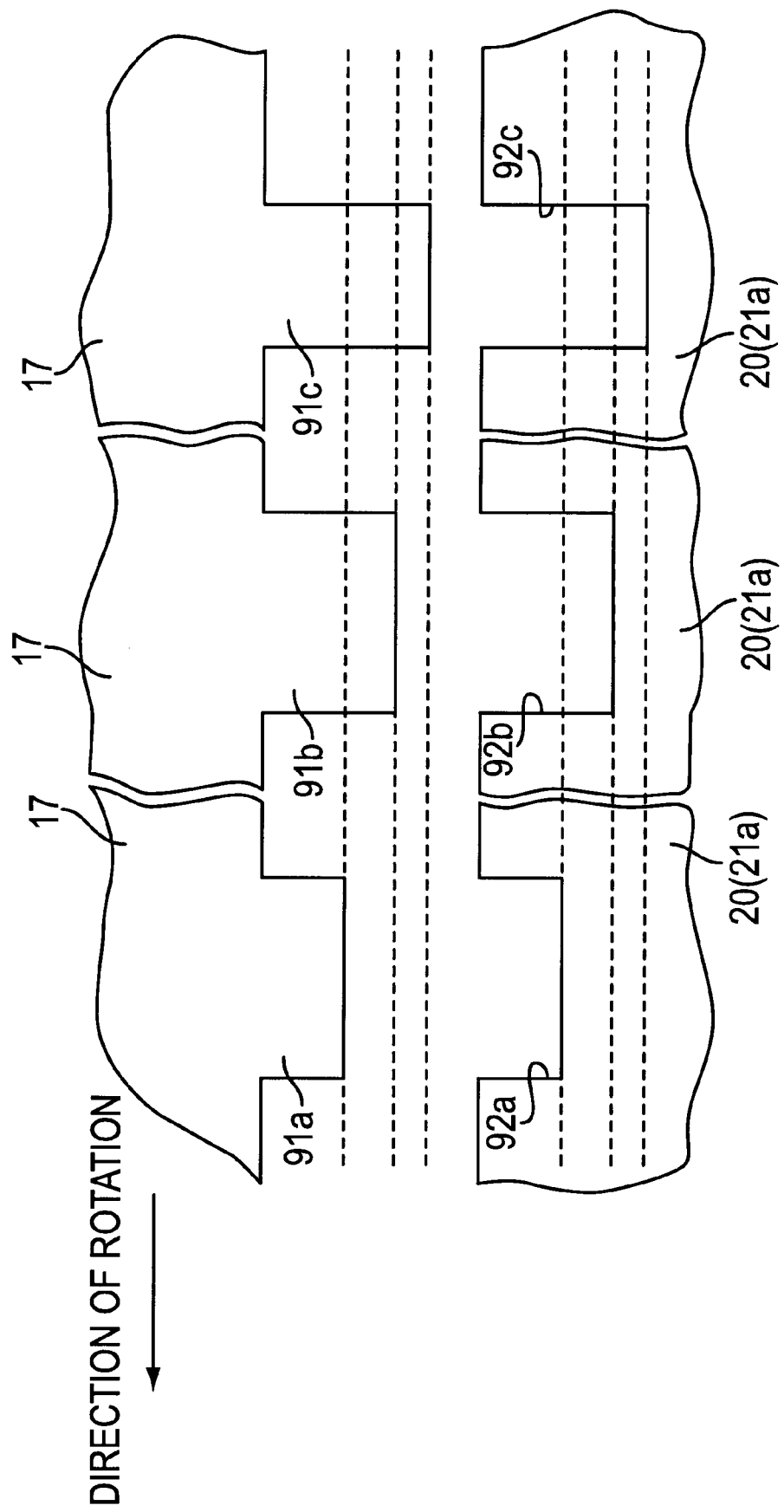
FIG. 14 is an explanatory developed view of three engaging projections of the first outer barrel and three cut-away portions of the first linear movement guide ring, according to another embodiment of the present invention.

FIG. 14 shows another embodiment (second embodiment) in which the three engaging projections formed on the first outer barrel 17 and the corresponding three cut-away portions formed on the first linear movement guide ring 20 have different dimensions from those in the previous embodiment. Similar to FIG. 9, the right and left direction (horizontal direction) of FIG. 14 represents the circumferential direction or rotational direction of the first outer barrel 17 or the first linear movement guide ring 20, while the up and down direction (vertical direction) of FIG. 14 represents the radial direction of the first outer barrel 17 or the first linear movement guide ring 20. In this second embodiment, three engaging projections (i.e., a first engaging projection 91a, a second engaging projection 91b and a third engaging projection 91c) are formed on the first outer barrel 17, while corresponding three cut-away portions (i.e., a first cut-away portion 92a, a second cut-away portion 92b and a third cut-away portion 93c) are formed on the first linear movement guide ring 20. It should be noted that three engaging projections which are similar to the three engaging projections in the second embodiment (91a, 91b and 91c) and three cut-away portions which are similar to the three cut-away portions in the second embodiment (92a, 92b and 93) can be formed not only on the first outer barrel 17 and the first linear movement guide ring 20, but also on the drive cam ring 30 and the second linear movement guide ring 33, respectively.

In the second embodiment, the first outer barrel 17 is provided on its inner peripheral surface at the rear end thereof with the engaging projections 91a, 91b and 91c, each extending inwardly in a radial direction of the first outer barrel 17. The engaging projections 91a, 91b and 91c are formed at specific positions on the first outer barrel 17 so as to correspond to the cut-away portions 92a, 92b and 92c, respectively. The heights of the engaging projections 91a, 91b and 91c are different from each other in the radial direction of the first outer barrel 17. More specifically, the height of the third engaging projection 91c is the greatest while the height of the first engaging projection 91a is the least among all the three engaging projections 91a, 91b and 91c. On the other hand, the widths of the first and second engaging projections 91a and 91b are the same but the width of the third engaging projection 91c is less than those of the first and second engaging projections 91a and 91b in a circumferential direction of the first outer barrel 17.

In the second embodiment, the front flange 21a of the first linear movement guide ring 20 is provided with the cut-away portions 92a, 92b and 92c through which the engaging projections 91a, 91b and 91c can enter the circumferential groove 21c in the direction of the optical axis O, respectively. The widths of the engaging projections 91a, 91b and 91c correspond to those of the cut-away portions 92a, 92b and 92c in the circumferential direction, respectively. Likewise, the heights of the engaging projections 91a, 91b and 91c in the radial direction correspond to the depths of the cut-away portions 92a, 92b and 92c in the circumferential direction, respectively.

In the second embodiment where the heights of the engaging projections 91a, 91b and 91c are all different from each other and the depths of the cut-away portions 92a, 92b and 92c are all different from each other, the first outer barrel 17 is rotated so as to move the first engaging projection 91a, whose height is less than the other two engaging projection 91b and 91c in the radial direction of the first outer barrel 17, towards the third cut-away portion 92c (whose depth is greater than the other two cut-away portions 92a and 92b in the radial direction of the first linear movement guide ring 20) without passing by the second cut-away portion 92b (whose depth is greater than the first cut-away portions 92a but less than the third cut-away portions 92c). In other words, the first outer barrel 17 is rotated in the rotational direction of moving the three engaging projections 91a, 91b and 91c, whose heights are different stepwisely in a circumferential direction, in the direction of the third engaging projection 91c towards the first engaging projection 91a. Rotation of the first outer barrel 17 in a specific rotational direction relative to the first linear movement guide ring 20 by a certain degree brings the first engaging projection 91a to face the third cut-away portion 92c. In this state, since the height of the first engaging projection 91a is less than the depth of the third cut-away portion 92c in the radial direction, the first engaging projection 91a does not disengage from the circumferential groove 21c through the third cut-away portions 92c. Furthermore, in such a state, although the second and third engaging projections 91b and 91c face the first and second cut-away portion 92a and 92b, respectively, the second and third engaging projections 91b and 91c do not disengage from the circumferential groove 21c through the first and second cut-away portion 92a and 92b, respectively, because the heights of the second and third engaging projections 91b and 91c are greater than the depths of the first and second cut-away portions 92a and 92b, respectively. Accordingly, the first outer barrel 17 does not disengage from the first linear movement guide ring 20 when the first, second and third engaging projections 91a, 91b and 91c face the third, first and second cut-away portions 92c, 92a and 92b, respectively. As can be understood from the foregoing, according to the second embodiment in which the heights of the engaging projections are different from each other while the width of at least one of the engaging projections is different from those of the other engaging projections, and the depths of the cut-away portions are different from each other while the width of at least one of the cut-away portions is different from those of the other cut-away portions, the first outer barrel 17 can be rotated relative to the first linear movement guide ring 20 by an angle of rotation of over 180 degrees without yielding any substantial play at the engaged portion therebetween, similar to the previous embodiment.

In the second embodiment, the width of the second engaging projection 91b and the second cut-away portion 92b can be made to correspond to the width of the third engaging projection 91c and the third cut-away portion 92c, while the width of the first engaging projection 91a and the first cut-away portion 92a can be made less than those of the other engaging projections or cut-away portions. Even with this modification, the first outer barrel 17 can be rotated relative to the first linear movement guide ring 20 by an angle of rotation of over 180 degrees without yielding any substantial play at the engaged portion therebetween, similar to the previous embodiments.

In the aforementioned first embodiment, it is herein assumed that the aforementioned stopper for preventing the first outer barrel 17 to further rotate in the rotational direction of the arrow D (in the counterclockwise direction in FIG. 8) from the position shown in FIG. 8 is not provided, and that the first outer barrel 17 can therefore be further rotated in that rotational direction relative to the first linear movement guide ring 20. With this assumption, after the first outer barrel 17 further rotates in the counterclockwise direction from the position shown in FIG. 8 by a certain degree, the first, second and third engaging projections 23a, 23b and 23c, face the second, third and first cut-away portions 22b, 22c and 22a, respectively. In this state, the third engaging projection 23c does not disengage from the circumferential groove 21c through the first cut-away portion 22a since the third engaging projection 23c is greater than the first cut-away portion 22a in width in the circumferential direction. The first engaging projection 23a also does not disengage from the circumferential groove 21c through the second cut-away portion 22b since the height of the first engaging projection 23a is greater than the depth of the second cut-away portion 22b in a radial direction. However, regarding a combination of the second engaging projection 23b and the third cut-away portion 22c, since the second engaging projection 23b is less than the third cut-away portion 22c in width in the circumferential direction, and the height of the second engaging projection 23b corresponds to the depth of the third cut-away portion 22c, a substantial play may occur and/or the first outer barrel 17 cannot smoothly rotate relative to the first linear movement guide ring 20 when the second engaging projection 23b passes by the third cut-away portion 22c as the second engaging projection 23b may get caught by the third cut-away portion 22c when passing thereby. This is also true for the second embodiment shown in FIG. 14. In the second embodiment under the same assumption, the first engaging projection 91a may disengage from the circumferential groove 21c through the second cut-away portion 92b when the first engaging projection 91a faces the second cut-away portion 92b.

Figure 15:
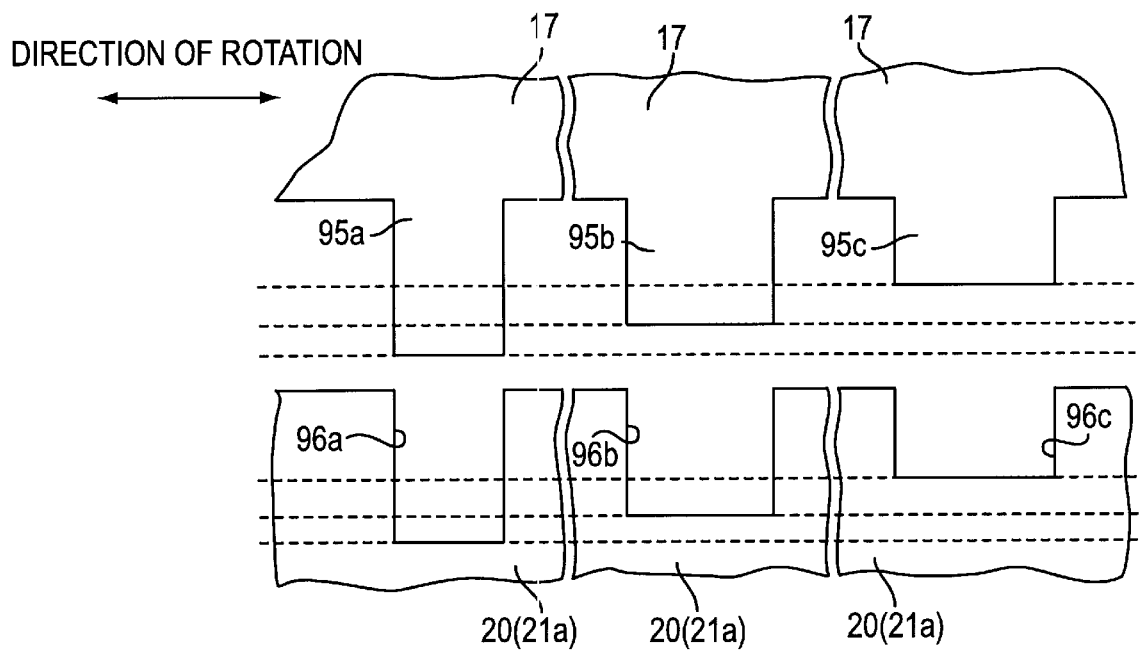
FIG. 15 is an explanatory developed view of three engaging projections of the first outer barrel and three cut-away portions of the first linear movement guide ring, according to still another embodiment of the present invention.
Figure 11:
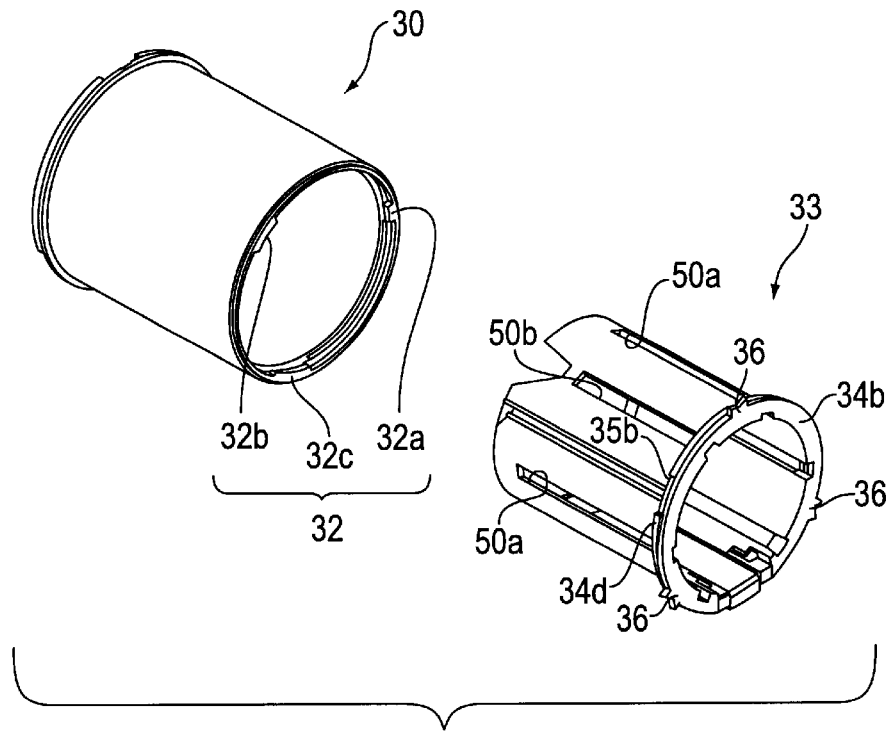
FIG. 11 is an exploded perspective view of the drive cam ring and the second linear movement guide ring shown in FIG. 10 which are seen from a different angle of view.
Figure 10:
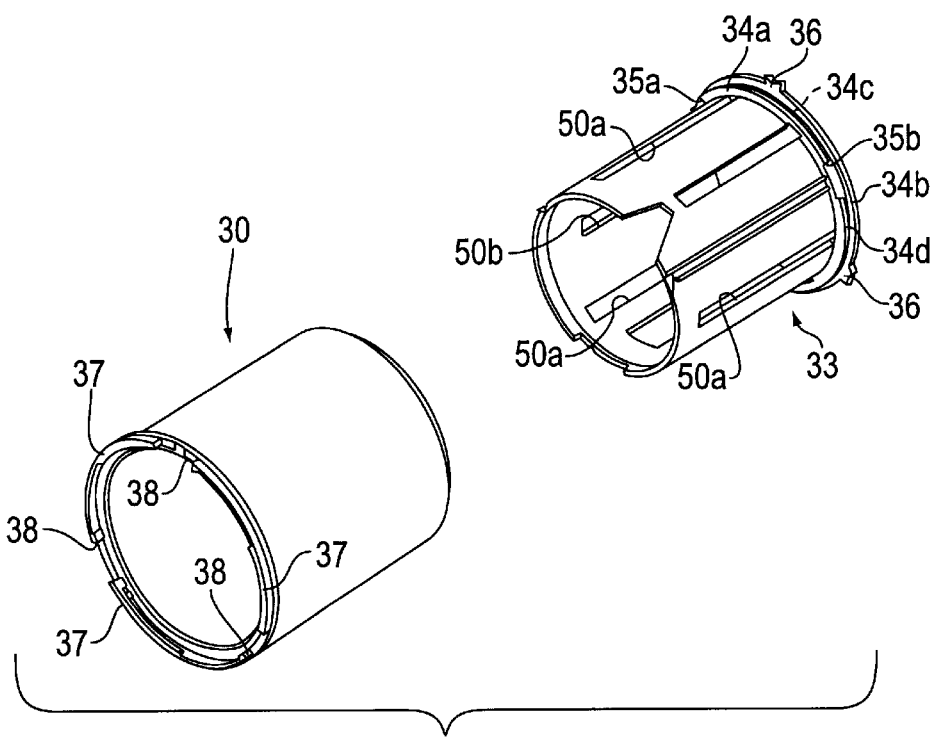
FIG. 10 is an exploded perspective view of a drive cam ring and a second linear movement guide ring in the zoom lens barrel shown in FIG. 4.

In order to overcome such a problem, if the first outer barrel 17 (or the drive cam ring 30) needs to be rotatable by an even larger rotational angle, the heights of the three engaging projections are preferably determined to stepwisely decrease in order from an engaging projection having the least width to another engaging projection having the greatest width in the circumferential direction; namely, the height of the engaging projection having the least width has the greatest height while the height of the engaging projection having the greatest width has the least height. FIG. 15 shows such structure according to a third embodiment of the present invention. Similar to FIG. 9 or 14, the right and left direction (horizontal direction) of FIG. 15 represents the circumferential direction or rotational direction first outer barrel 17 or the first linear movement guide ring 20, while the up and down direction (vertical direction) of FIG. 14 represents the radial direction of the first outer barrel 17 or the first linear movement guide ring 20. In this third embodiment, three engaging projections (i.e., a first engaging projection 95a, a second engaging projection 95b and a third engaging projection 95c) are formed on the first outer barrel 17, while corresponding three cut-away portions (i.e., a first cut-away portion 96a, a second cut-away portion 96b, and a third cut-away portion 96c) are formed on the first linear movement guide ring 20. It should be noted that the three engaging projections which are similar to the three engaging projections in the third embodiment (95a, 95b and 95c), and the three cut-away portions which are similar to the three cut-away portions in the third embodiment (96a, 96b and 96) can be formed not only on the first outer barrel 17 and the first linear movement guide ring 20, but also on the drive cam ring 30 and the second linear movement guide ring 33, respectively.

In the third embodiment, the first outer barrel 17 is provided on its inner peripheral surface at the rear end thereof with the engaging projections 95a, 95b and 95c, each extending inwardly in a radial direction of the first outer barrel 17. The engaging projections 95a, 95b and 95c are formed at specific positions on the first outer barrel 17 so as to correspond to the cut-away portions 96a, 96b and 96c, respectively. The third engaging projection 95c has the greatest width, while the first engaging projection 95a has the least width in a circumferential direction of the first outer barrel 17. On the other hand, the first engaging projection 95a has the greatest height while the third engaging projection 95c has the least height in the radial direction of the first outer barrel 17.

According to the structure of the third embodiment, each of the three engaging projections 95a, 95b and 95c cannot disengage from the circumferential groove 21c unless they are facing the corresponding cut-away portions, since either the height or width of each engaging projection is always greater than the depth or width of the cut-away portion corresponding to any of the other engaging projections. Therefore, the first outer barrel 17 can be rotated in either rotational direction by an angle of rotation of almost 360 degrees with each engaging projection being stably engaged with the circumferential groove 21c, which contributes greatly to the degree of freedom in designing the zoom lens barrel 10.

As can be understood from the foregoing, according to the zoom lens barrel 10 to which the present invention is applied, in order to realize a large relative rotational angle between the two barrels, it is no more necessary to provide any extra rotatable member or to decrease the number of engaging projections. Since it is not necessary to provide any extra rotatable member, the engaging structure to which the present invention is applied can contribute to making the zoom lens barrel small and compact. Furthermore, the engaging structure to which the present invention is applied is advantageous in regard to the cost of production because the engaging structure can be realized by simply forming engaging projections and corresponding cut-away portions in specified shapes as described above. The engaging structure to which the present invention is applied can be applied not only to a pair of relatively rotatable members provided in a zoom lens barrel but also any other pair of relatively rotatable members.

The engaging structure to which the present invention is applied is also advantageous in a zoom lens barrel when the zoom lens barrel is of a telescoping type using a helicoid engagement for advancing or retracting a movable barrel. In the case where such a helicoid engagement is used for advancing or retracting a movable barrel (first barrel), the movable barrel is usually provided with a male helicoid (or female helicoid), and another barrel (second barrel) which is fitted in or onto the movable barrel is provided with a female helicoid (or male helicoid) meshing with the male helicoid (or female helicoid) of the movable barrel. The zoom lens barrel is further provided with a linear movement guide member for guiding either the first or second barrel in axial direction without rotating the same relative to the other barrel. Due to such a structure, if the maximum degree of rotation of either barrel (first or second barrel) relative to the linear movement guide member is large, the degree of rotation of the either barrel relative to the linear movement guide member per a unit of movement of the either barrel in the direction of the optical axis can be made large, which makes it possible to have the inclination of the threads of the helicoids formed on the first and second barrels large relative to the direction of the optical axis. In the case of the inclination of the threads of the helicoids being large, the helicoid threads effectively function to prevent ambient light from entering the zoom lens barrel between the first and second barrels. Moreover, in the case where the helicoids are regularly and continuously formed on the first and second barrels in the optical axis direction, the amount of engagement of the first barrel with the second barrel is generally large when the inclination of threads of the helicoids is large, which make it possible to improve the strength of the zoom lens barrel.

In each of the aforementioned embodiments, since the rotation of the first outer barrel 17 is transmitted to the drive cam ring 30 via the second outer barrel 40, the relation between the first outer barrel 17 and the first linear movement guide ring 20 is somewhat complicated; however, the inclination of the female helicoid 27 of the first linear movement guide ring 20 and the male helicoid 29 of the drive cam ring 30 can be made large with respect to the direction of the optical axis O if the maximum rotational amount of the first outer barrel 17 relative to the first linear movement guide ring 20 is large.

In addition, in the case of detecting a focal length of the zoom lens barrel 10 by means of detecting a rotational position (angular position) of the first outer barrel 17 relative to the first linear movement guide ring 20, the maximum amount of movement of the conductive brush 70 relative to the code sheet 80 can be made large if the maximum rotational amount of the first outer barrel 17 relative to the first linear movement guide ring 20 is large. This makes it possible to form the code sheet 80 as a long code sheet having many detection lands formed thereon so as to precisely detect the rotational position of the first outer barrel 17 relative to the first linear movement guide ring 20 to thereby detect a precise focal length.

In each of the aforementioned embodiments, although a circumferential groove (21c or 34c) and three cut-away portions (22, 35, 92 or 96) are formed on a large-diameter cylindrical member (17 or 30) while three engaging projections (23, 32, 91 or 95) are formed on a small-diameter cylindrical member (20 or 33), the circumferential groove and the three cut-away portions can be formed on the small-diameter cylindrical member while the three engaging projections can be formed on the large-diameter cylindrical member.

In each of the aforementioned embodiments, three engaging projections and corresponding three cut-away portions are provided as mentioned above. However, the present invention can also be applied to another case where only two engaging projections and corresponding two cut-away portions are provided. For instance, in the case where a pair of engaging projections are formed on a first barrel at opposite circumferential positions while a corresponding pair of cut-away portions are formed on a second barrel at opposite circumferential positions, the maximum angle of rotation of one of the two barrels relative to the other barrel is 180 degrees in theory if the shapes of the pair of engaging projection and the pair of cut-away portions all correspond to each other. However, if the width of one of the pair of engaging projections is formed greater than that of the other engaging projection in a circumferential direction and at the same time the width of one of the pair of cut-away portions is formed to correspond to the width of the long-width engaging projection, the wider engaging projection remains engaged with the second barrel even when the first barrel is rotated by 180 degrees relative to the second barrel. However, as substantial play may occur between the first and second barrels at the position of the short-width engaging projection, and/or the narrower engaging projection may even disengage from the second barrel, the narrower engaging projection is preferably formed such that the narrower engaging projection has a greater height than the other engaging projection in the radial direction and at the same time the cut-away portion which corresponds to the narrower engaging projection has a depth corresponding to the height of the narrower engaging projection. According to such a structure, each engaging projection is always engaged with a circumferential groove formed on the second barrel except when facing the corresponding cut-away portion, which makes it possible for one of the two barrels to stably rotate relative to the other barrel by an angle of rotation of almost 360 degrees even if there are provided only two engaging projections and corresponding two cut-away portions.

In each of the aforementioned embodiments, three engaging projections and corresponding three cut-away portions are provided as mentioned above. However, the present invention can also be applied to still another case where more than three engaging projections and corresponding cut-away portions are provided. In this case, an effect similar to those of the aforementioned embodiments can be expected by changing the width and/or height (or depth) of each engaging projection and each cut-away portion in an appropriate manner. Specifically, by making the heights of engaging projections to stepwisely decrease in order from an engaging projection having the least width to another engaging projection having the greatest width in the circumferential direction and by making the depths of the cut-away portions to stepwisely decrease in order from a cut-away portion having the least width to another cut-away portion having the greatest width in the circumferential direction so as to correspond to the heights of the engaging projections, the height or width of each engaging projection is always greater than the depth or width of the cut-away portion of another engaging projection, which makes it possible to keep all the engaging projections to be engaged with the circumferential groove without producing substantial play therebetween.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An engaging structure of two cylindrical members, wherein at least part of one of said two cylindrical members is coaxially fitted on the other cylindrical member, said engaging structure comprising:

a plurality of engaging projections which project radially from said one cylindrical member at different circumferential positions thereon;

two annular flanges formed on said other cylindrical member along a circumference thereof to form a circumferential groove between said two annular flanges, said plurality of engaging projections being fitted in said circumferential groove to be guided along said circumferential groove so as to allow relative rotation between said two cylindrical members; and a plurality of cut-away portions which are formed on one of said two annular flanges to correspond to said plurality of engaging projections and through which said plurality of engaging projections are respectively inserted into said circumferential groove, wherein each corresponding pair of said plurality of engaging projections and said plurality of cut-away portions are formed to have a width in a circumferential direction that is different from those of the other corresponding pairs of said plurality of engaging projections and said plurality of cut-away portions, and wherein at least one of corresponding pairs of said plurality of engaging projections and said plurality of cut-away portions are formed to have a length in a radial direction that is different from those of the other corresponding pairs of said plurality of engaging projections and said plurality of cut-away portions.

2. The engaging structure according to claim 1, wherein said plurality of engaging projections comprise three engaging projections formed at regular intervals along a circumference of said one cylindrical member, wherein said plurality of cut-away portions comprises three cut-away portions formed to correspond to said three engaging projections at regular intervals along a circumference of said the other cylindrical member, and wherein one of corresponding pairs of said three engaging projections and said three cut-away portions which has the least circumferential width has a greater radial length than another one of said corresponding pairs of said three engaging projections and said three cut-away portions which has the greatest circumferential width.

3. The engaging structure according to claim 2, wherein said two cylindrical members are relatively rotated about said common axis in a manner such that one of said three engaging projections which has said least circumferential width proceeds towards one of said three cut-away portions which has said greatest circumferential width without passing by another one of said three cut-away portions between said one of said three cut-away portions which has said greatest circumferential width and the other one of said three cut-away portions which has said least circumferential width along said circumferential groove.

4. The engaging structure according to claim 3, wherein said one of said three cut-away portions which has said greatest circumferential width is next to said one of said three cut-away portions which has said least circumferential width in a direction of relative rotation of said one of said three engaging projections which has said least circumferential width toward said one of said three cut-away portions which has said greatest circumferential width.

5. The engaging structure according to claim 1, wherein said two cylindrical members are elements of a zoom lens barrel of a camera.

6. The engaging structure according to claim 5, wherein one of said two cylindrical members is provided thereon with a code sheet which extends along a circumference of said one of said two cylindrical members, wherein the other of said two cylindrical members is provided with a conductive brush which comes into contact with said code sheet, and wherein said conductive brush slides on said code sheet when said two cylindrical members rotate relative to each other about said common axis.

7. An engaging structure of two cylindrical members, wherein at least part of one of said two cylindrical members is coaxially fitted on the other cylindrical member, said engaging structure comprising:

a plurality of engaging projections which project radially from said one cylindrical member at different circumferential positions thereon;

two annular flanges formed on said other cylindrical member along a circumference thereof to form a circumferential groove between said two annular flanges, said plurality of engaging projections being fitted in said circumferential groove to be guided along said circumferential groove so as to allow relative rotation between said two cylindrical members; and a plurality of cut-away portions which are formed on one of said two annular flanges to correspond to said plurality of engaging projections and through which said plurality of engaging projections are respectively inserted into said circumferential groove, wherein each corresponding pair of said plurality of engaging projections and said plurality of cut-away portions are formed to have a length in a radial direction that is different from those of the other corresponding pairs of said plurality of engaging projections and said plurality of cut-away portions, and wherein at least one of corresponding pairs of said plurality of engaging projections and said plurality of cut-away portions are formed to have a width in a circumferential direction that is different from those of the other corresponding pairs of said plurality of engaging projections and said plurality of cut-away portions.

8. The engaging structure according to claim 7, wherein said plurality of engaging projections comprise three engaging projections formed at regular intervals along a circumference of said one cylindrical member, wherein said plurality of cut-away portions comprises three cut-away portions formed to correspond to said three engaging projections at regular intervals along a circumference of said the other cylindrical member, and wherein one of corresponding pairs of said three engaging projections and said three cut-away portions which has the least radial length has a greater circumferential width than another one of said corresponding pairs of said three engaging projections and said three cut-away portions which has the greatest radial length.

9. The engaging structure according to claim 8, wherein said two cylindrical members are relatively rotated about said common axis in a manner such that one of said three engaging projections which has said least radial length proceeds towards one of said three cut-away portions which has said greatest radial length without passing by another one of said three cut-away portions between said one of said three cut-away portions which has said greatest radial length and the other one of said three cut-away portions which has said least radial length along said circumferential groove.

10. The engaging structure according to claim 9, wherein said one of said three cut-away portions which has said greatest circumferential width is next to said one of said three cut-away portions which has said least circumferential width in a direction of relative rotation of said one of said three engaging projections which has said least circumferential width toward said one of said three cut-away portions which has said greatest circumferential width.

11. The engaging structure according to claim 7, wherein said two cylindrical members are elements of a zoom lens barrel of a camera.

12. The engaging structure according to claim 11, wherein one of said two cylindrical members is provided thereon with a code sheet which extends along a circumference of said one of said two cylindrical members, wherein the other of said two cylindrical members is provided with a conductive brush which comes into contact with said code sheet, and wherein said conductive brush slides on said code sheet when said two cylindrical members rotate relative to each other about said common axis.

13. An engaging structure of two cylindrical members, wherein at least part of one of said two cylindrical members is coaxially fitted on the other cylindrical member, said engaging structure comprising:

a plurality of engaging projections which project radially from said one cylindrical member at different circumferential positions thereon;

two annular flanges formed on said the other cylindrical member along a circumference thereof to form a circumferential groove between said two annular flanges, said plurality of engaging projections being fitted in said circumferential groove to be guided along said circumferential groove so as to allow relative rotation between said two cylindrical members; and a plurality of cut-away portions which are formed on one of said two annular flanges to correspond to said plurality of engaging projections and through which said plurality of engaging projections are respectively inserted into said circumferential groove, wherein each corresponding pair of said plurality of engaging projections and said plurality of cut-away portions are formed to have a width in a circumferential direction and a length in a radial direction which are different from those of the other corresponding pairs of said plurality of engaging projections and said plurality of cut-away portions.

14. The engaging structure according to claim 13, wherein radial lengths of said plurality of engaging projections are determined to decrease stepwisely in order from one of said plurality of engaging projections which has the least circumferential width to another one of said plurality of engaging projections which has the greatest circumferential width in said circumferential direction, so that said one of said plurality of engaging projections which has said least circumferential width has the greatest radial length while said another one of said plurality of engaging projections which has said greatest circumferential width has the least radial length, and wherein radial lengths of said plurality of cut-away portions are determined to decrease stepwisely in order from one of said plurality of cut-away portions which has the least circumferential width to another one of said plurality of cut-away portions which has the greatest circumferential width in said circumferential direction, so as to correspond to said radial lengths of said plurality of engaging projections.

15. The engaging structure according to claim 13, wherein said two cylindrical members are elements of a zoom lens barrel of a camera.

16. The engaging structure according to claim 15, wherein one of said two cylindrical members is provided thereon with a code sheet which extends along a circumference of said one of said two cylindrical members, wherein the other of said two cylindrical members is provided with a conductive brush which comes into contact with said code sheet, and wherein said conductive brush slides on said code sheet when said two cylindrical members rotate relative to each other about said common axis.

17. A zoom lens barrel of a camera, comprising:

a first cylindrical member guided along an optical axis without rotating about said optical axis;

a second cylindrical member coaxially positioned on said first cylindrical member; and an engaging structure for engaging said first cylindrical member with said second cylindrical member so as to prevent said second cylindrical member from moving in a direction of said optical axis relative to said first cylindrical member while allowing said second cylindrical member to rotate about said optical axis relative to said first cylindrical member, wherein said engaging structure comprises:

a plurality of engaging projections which project radially from said second cylindrical member at different circumferential positions thereon;

two annular flanges formed on said first cylindrical member along a circumference thereof to form a circumferential groove between said two annular flanges, said plurality of engaging projections being fitted in said circumferential groove to be guided along said circumferential groove so as to allow relative rotation between said first and second cylindrical members about said optical axis; and a plurality of cut-away portions which are formed on one of said two annular flanges to correspond to said plurality of engaging projections and through which said plurality of engaging projections are respectively inserted into said circumferential groove, wherein each corresponding pair of said plurality of engaging projections and said plurality of cut-away portions are formed to have a width in a circumferential direction that is different from those of the other corresponding pairs of said plurality of engaging projections and said plurality of cut-away portions, and wherein at least one of corresponding pairs of said plurality of engaging projections and said plurality of cut-away portions are formed to have a length in a radial direction that is different from those of the other corresponding pairs of said plurality of engaging projections and said plurality of cut-away portions.

18. A zoom lens barrel of a camera, comprising:

a first cylindrical member guided along an optical axis without rotating about said optical axis;

a second cylindrical member coaxially positioned on said first cylindrical member; and an engaging structure for engaging said first cylindrical member with said second cylindrical member so as to prevent said second cylindrical member from moving in a direction of said optical axis relative to said first cylindrical member while allowing said second cylindrical member to rotate about said optical axis relative to said first cylindrical member, wherein said engaging structure comprises:

a plurality of engaging projections which project radially from said second cylindrical member at different circumferential positions thereon;

two annular flanges formed on said first cylindrical member along a circumference thereof to form a circumferential groove between said two annular flanges, said plurality of engaging projections being fitted in said circumferential groove to be guided along said circumferential groove so as to allow relative rotation between said first and second cylindrical members about said optical axis; and a plurality of cut-away portions which are formed on one of said two annular flanges to correspond to said plurality of engaging projections and through which said plurality of engaging projections are respectively inserted into said circumferential groove, wherein each corresponding pair of said plurality of engaging projections and said plurality of cut-away portions are formed to have a length in a radial direction that is different from those of the other corresponding pairs of said plurality of engaging projections and said plurality of cut-away portions, and wherein at least one of corresponding pairs of said plurality of engaging projections and said plurality of cut-away portions are formed to have a width in a circumferential direction that is different from those of the other corresponding pairs of said plurality of engaging projections and said plurality of cut-away portions.

19. A zoom lens barrel of a camera, comprising:

a first cylindrical member guided along an optical axis without rotating about said optical axis;

a second cylindrical member coaxially positioned on said first cylindrical member; and an engaging structure for engaging said first cylindrical member with said second cylindrical member so as to prevent said second cylindrical member from moving in a direction of said optical axis relative to said first cylindrical member while allowing said second cylindrical member to rotate about said optical axis relative to said first cylindrical member, wherein said engaging structure comprises:

a plurality of engaging projections which project radially from said second cylindrical member at different circumferential positions thereon;

two annular flanges formed on said first cylindrical member along a circumference thereof to form a circumferential groove between said two annular flanges, said plurality of engaging projections being fitted in said circumferential groove to be guided along said circumferential groove so as to allow relative rotation between said first and second cylindrical members about said optical axis; and a plurality of cut-away portions which are formed on one of said two annular flanges to correspond to said plurality of engaging projections and through which said plurality of engaging projections are respectively inserted into said circumferential groove, wherein each corresponding pair of said plurality of engaging projections and said plurality of cut-away portions are formed to have a circumferential width and a radial length that are different from those of the other corresponding pairs of said plurality of engaging projections and said plurality of cut-away portions.

20. An engaging structure of a first cylindrical member and a second cylindrical member being at least partly coaxially fitted, said engaging structure comprising:

an annular flange formed on said first cylindrical member, said annular flange forming one wall of a circumferential groove;

engaging projections projecting radially from said second cylindrical member at different circumferential positions; and cut-away slots formed in said annular flange in circumferential positions corresponding to said engaging projections, said engaging projections being inserted to pass through said circumferential groove via corresponding ones of said cut-away slots, said circumferential groove permitting relative rotation between said first cylindrical member and said second cylindrical member and relative rotation of said engaging projections along said circumferential groove, at least one of said engaging projections and a corresponding one of said cut-away slots having a different size in a first direction from the remaining engaging projections and remaining cut-away slots, and each of said engaging projections and corresponding said cut-away slots having a different size in a second direction from the remaining engaging projections and remaining cut-away slots, so that when said at least one engaging projection is relatively rotated to face one of said remaining cut-away slots, said at least one engaging projection is prevented from passing through said one of said remaining cut-away slots.

21. The engaging structure according to claim 20, each of said engaging projections and corresponding said cut-away slots differing in one of a circumferential width and radial length from the remaining engaging projections and remaining cut-away slots, so that when any one of said engaging projections is relatively rotated to face one of said remaining cut-away slots, said any one of said engaging projections is prevented from passing through said one of said remaining cut-away slots.

22. A zoom lens barrel of a camera, comprising:

a first cylindrical member guided along an optical axis without rotating about said optical axis, an annular flange formed in said first cylindrical member, said annular flange forming one wall of a circumferential groove in said first cylindrical member;

a second cylindrical member coaxially positioned on said first cylindrical member, engaging projections projecting radially from said second cylindrical member at different circumferential positions;

cut-away slots being formed in said annular flange in circumferential positions corresponding to said engaging projections, said engaging projections being inserted to pass through said circumferential groove via corresponding ones of said cut-away slots, said circumferential groove permitting relative rotation between said first cylindrical member and said second cylindrical member and relative rotation of said engaging projections along said circumferential groove, at least one of said engaging projections and a corresponding one of said cut-away slots differing in one of a circumferential width and radial length from the remaining engaging projections and remaining cut-away slots, so that when said at least one engaging projection is relatively rotated to face one of said remaining cut-away slots, said at least one engaging projection is prevented from passing through said one of said remaining cut-away slots, preventing said second cylindrical member from moving in a direction of said optical axis relative to said first cylindrical member while allowing said second cylindrical member to rotate about said optical axis relative to said first cylindrical member.

23. The zoom lens barrel according to claim 22, each of said engaging projections and corresponding said cut-away slots differing in the remaining one of said circumferential width and radial length from the remaining engaging projections and remaining cut-away slots.

24. The zoom lens barrel according to claim 23, each of said engaging projections and corresponding said cut-away slots differing in said one of said circumferential width and radial length from the remaining engaging projections and remaining cut-away slots, so that when any one of said engaging projections is relatively rotated to face one of said remaining cut-away slots, said any one of said engaging projections is prevented from passing through said one of said remaining cut-away slots.

* * * * *